United States Patent
Zheng et al.

(10) Patent No.: US 12,446,049 B2
(45) Date of Patent: Oct. 14, 2025

(54) CONTROL INFORMATION TRANSMISSION METHOD

(71) Applicant: HUAWEI TECHNOLOGIES CO., LTD., Guangdong (CN)

(72) Inventors: Juan Zheng, Beijing (CN); Chaojun Li, Beijing (CN); Yongqiang Fei, Shenzhen (CN); Hailong Hou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 438 days.

(21) Appl. No.: 17/961,793

(22) Filed: Oct. 7, 2022

(65) Prior Publication Data
US 2023/0038936 A1 Feb. 9, 2023

Related U.S. Application Data

(63) Continuation of application No. PCT/CN2021/086730, filed on Apr. 12, 2021.

(30) Foreign Application Priority Data

Apr. 10, 2020 (CN) .......................... 202010280859.8

(51) Int. Cl.
*H04W 72/23* (2023.01)
(52) U.S. Cl.
CPC .................. *H04W 72/23* (2023.01)
(58) Field of Classification Search
CPC .......................... H04W 72/23; H04W 72/0453; H04L 1/0072; H04L 1/1822; H04L 1/1819;
(Continued)

(56) References Cited

U.S. PATENT DOCUMENTS

| 2004/0081124 A1 | 4/2004 | Black et al. |
| 2019/0261405 A1 | 8/2019 | Ang et al. |

(Continued)

FOREIGN PATENT DOCUMENTS

| CN | 110391867 A | 10/2019 |
| CN | 110475356 A | 11/2019 |

(Continued)

OTHER PUBLICATIONS

European Search Report for EP Application No. 21783889.5 dated Jul. 31, 2023, 15 pages.

(Continued)

*Primary Examiner* — Shawn D Miller

(57) ABSTRACT

The technology of this application provides a control information transmission method, so that sizes of different downlink control information (DCI) can be aligned, thereby reducing types of DCI sizes and reducing power consumption when a terminal detects DCI. The method includes a terminal device detecting first DCI in a first search space, where the first DCI is used to indicate an active bandwidth part (BWP) of the terminal device, a size of the first DCI and a size of second DCI are aligned, the second DCI can be sent by a network device to the terminal device in a first common search space, and the second DCI is used to schedule a system message, a paging message, or a random access response (RAR).

20 Claims, 2 Drawing Sheets

(58) Field of Classification Search
CPC ... H04L 1/1854; H04L 1/1861; H04L 1/1896; H04L 5/0053; H04L 5/0055; H04L 5/001; H04L 5/003; H04L 5/0094; Y02D 30/70
See application file for complete search history.

(56) References Cited

U.S. PATENT DOCUMENTS

| | | | |
|---|---|---|---|
| 2019/0297604 A1 | 9/2019 | Lee et al. | |
| 2019/0387501 A1 | 12/2019 | Park et al. | |
| 2020/0100248 A1 | 3/2020 | Kim et al. | |
| 2020/0396760 A1* | 12/2020 | Yi | H04W 72/23 |
| 2021/0250156 A1* | 8/2021 | Kim | H04W 76/27 |
| 2023/0034987 A1* | 2/2023 | Yi | H04L 5/0091 |

FOREIGN PATENT DOCUMENTS

| | | |
|---|---|---|
| CN | 110944388 A | 3/2020 |
| EP | 3525386 A1 | 8/2019 |
| EP | 3662715 A1 | 6/2020 |
| WO | 2019050379 A1 | 3/2019 |
| WO | 2019087361 A1 | 5/2019 |
| WO | 2019143164 A1 | 7/2019 |
| WO | 2019215706 A1 | 11/2019 |
| WO | 2019222922 A1 | 11/2019 |
| WO | 2020040267 A1 | 2/2020 |

OTHER PUBLICATIONS

Ericsson, New SID on support of reduced capability NR devices. 3GPP TSG RAN Meeting #86, Sitges, Spain, Dec. 9-12, 2019, RP-193238, 5 pages.
3GPP TS 38.214 V16.1.0 (Mar. 2020), 3rd Generation Partnership Project; Technical Specification Group Radio Access Network; NR; Physical layer procedures for data(Release 16), 151 pages.
International Search Report and Written Opinion issued in PCT/CN2021/086730, dated Jun. 24, 2021, 10 pages.
European Search Report for EP Application No. 21783889.5 dated Jul. 5, 2023, 12 pages.

* cited by examiner

CONTROL INFORMATION TRANSMISSION METHOD

CROSS-REFERENCE TO RELATED APPLICATIONS

This application is a continuation of International Application No. PCT/CN2021/086730, filed on Apr. 12, 2021, which claims priority to Chinese Patent Application No. 202010280859.8, filed on Apr. 10, 2020. The disclosures of the aforementioned applications are hereby incorporated by reference in their entireties.

TECHNICAL FIELD

Embodiments of this application relate to the field of communications technologies, and in particular, to a control information transmission method, apparatus, and system.

BACKGROUND

With development of communications technologies and an increase in user requirements, terminal devices in a communication scenario gradually exhibit characteristics such as a large quantity and a plurality of forms. For example, in an industrial automation scenario, there are a large quantity of monitoring devices, machines, sensors, and the like in a factory building. In a home and life scenario, there are a large quantity of mobile phones, tablets, wearable devices, smart appliances, vehicle-mounted terminal devices, or the like.

SUMMARY

Embodiments of this application provide a control information transmission method, to reduce power consumption when a terminal device detects control information.

According to a first aspect, a control information transmission method is provided, including: detecting first downlink control information (DCI) in a first search space. The first DCI is used to indicate an active bandwidth part (BWP) of a terminal device, the active BWP is used by the terminal device and the network device to transmit a physical data channel, and a size of the first DCI and a size of second DCI are aligned. The second DCI is DCI that can be transmitted in a first common search space, and the second DCI is used to schedule a common message. Optionally, the common message may be a system message, a paging message, or a random access response (RAR). Optionally, the first search space is a first specific search space.

The method may alternatively be described as: detecting second downlink control information DCI from a network device in a first common search space of a terminal device. The second DCI is used to schedule a common message, and a size of the second DCI and a size of first DCI are aligned. The first DCI is DCI that can be transmitted in a first search space, and the first DCI is used to indicate an active bandwidth part BWP of the terminal device. The active BWP is used by the terminal device and the network device to transmit a physical data channel. Optionally, the common message may be a system message, a paging message, or a random access response RAR. Optionally, the first search space is a first specific search space.

According to the method, a size of DCI (e.g., the first DCI) transmitted in the first search space of the terminal device is the same as a size of DCI (e.g., the second DCI) transmitted in the first common search space of the terminal device, so that types of DCI sizes detected by the terminal device may be reduced. In this way, a quantity of times of detecting a physical downlink control channel (PDCCH) by the terminal device may be reduced. In addition, the active BWP of the terminal device is indicated in the first DCI, so that a BWP switching function may be implemented, and the terminal device may fully utilize a frequency domain diversity gain when transmitting information. For example, when the method is applied to a terminal device (for example, a REDCAP terminal) with relatively narrow bandwidth, a frequency domain resource may be allocated to the terminal device in a relatively large bandwidth range through BWP switching, to improve data transmission reliability by using a frequency domain diversity gain.

In a possible implementation, the first specific search space is included in a plurality of specific search spaces of the terminal device, one of the plurality of specific search spaces corresponds to N1 DCI formats, and the plurality of specific search spaces correspond to N2 DCI formats in total. Sizes of DCI in the N2 DCI formats are aligned when the DCI is transmitted in a corresponding specific search space. N1 is an integer greater than or equal to 1, and N2 is an integer greater than or equal to N1.

According to the method, sizes of DCI transmitted in the plurality of specific search spaces of the terminal device are the same, so that types of DCI sizes detected by the terminal device may be reduced. In this way, a quantity of times of detecting a PDCCH by the terminal device may be reduced.

In a possible implementation, that a size of the first DCI and a size of second DCI are aligned includes:

a quantity of bits of a bit stream of the first DCI is equal to a quantity of bits of a bit stream of the second DCI, where the bit stream of the first DCI is an information bit stream of the first DCI, or the bit stream of the first DCI is a bit stream obtained after an information bit stream of the first DCI is padded or truncated; and the bit stream of the second DCI is an information bit stream of the second DCI; or the bit stream of the first DCI is a bit stream obtained after a first operation is performed on an information bit stream of the first DCI, and the bit stream of the second DCI is a bit stream obtained after a first operation is performed on an information bit stream of the second DCI, where the first operation includes one or more of the following operations: adding a cyclic redundancy check CRC bit, channel coding, and scrambling; or a quantity of modulation symbols corresponding to the first DCI is equal to a quantity of modulation symbols corresponding to the second DCI.

According to the method, alignment of the size of the first DCI and the size of the second DCI may be implemented.

In a possible implementation, the first DCI is truncated, or the first DCI includes a padding bit. Optionally, one or more of the following information fields in the first DCI are truncated: a frequency domain resource allocation field and a transmission parameter of a second transport block. Optionally, when the frequency domain resource allocation field is truncated, one or more most significant bits of the frequency domain resource allocation field are cut off. Optionally, when the transmission parameter of the second transport block is truncated, the first DCI includes a transmission parameter of a first transport block, and the transmission parameter of the second transport block is the same as the transmission parameter of the first transport block. According to the method, alignment of the size of the first DCI and the size of the second DCI may be implemented.

In a possible implementation, the first DCI includes a frequency domain resource allocation field, which is used to indicate a frequency domain resource allocated to the physical data channel in the active BWP. A size of the frequency domain resource allocation field is determined based on bandwidth of an initial BWP, and the initial BWP is used by the terminal device to receive a synchronization signal block (SSB) from the network device. Alternatively, a size of the frequency domain resource allocation field is determined based on bandwidth of a control resource set CORESET 0, and the CORESET 0 is used by the terminal device to receive, from the network device, DCI scrambled by using a system information radio network temporary identifier (SI-RNTI).

According to the method, the size of the frequency domain resource allocation field in the first DCI may be aligned with a size of a frequency domain resource allocation field in the second DCI, so that alignment of the size of the first DCI and the size of the second DCI may be better implemented.

In a possible implementation, the first DCI can also be transmitted in a second common search space. The method may alternatively be described as that the first search space is the second common search space. According to the method, when a spare resource in the second common search space is not used, the network device may transmit the first DCI to the terminal device by using the resource, thereby improving resource utilization. When the first DCI is transmitted in the second common search space, a radio network temporary identifier (RNTI) of the first DCI is scrambled by using a user equipment (UE)-specific RNTI. In addition, common DCI scrambled by using a common RNTI may also be transmitted in the second common search space. When receiving DCI in the second common search space, the terminal device may obtain, by descrambling the DCI, an RNTI used to scramble the DCI, and therefore may determine whether the DCI is UE-specific DCI or common DCI. The second common search space may be the same as or different from the first common search space.

In a possible implementation, the physical data channel includes a physical downlink shared channel (PDSCH) or a physical uplink shared channel (PUSCH), and the first DCI is further used to indicate whether the first DCI is used to schedule the PDSCH or used to schedule the PUSCH. According to the method, DCI of one size may be used to schedule a plurality of different channels, thereby implementing more scheduling functions, and enabling a base station and UE to transmit a plurality of channels with low power consumption.

In a possible implementation, the first DCI includes an identifier field for DCI formats. When the identifier field is a first value, the first DCI is used to schedule a PUSCH. When the identifier field is a second value, the first DCI is used to schedule a PDSCH. According to the method, DCI of one size may be simply used to schedule a plurality of different channels.

In a possible implementation, when the first DCI is scrambled by using a first RNTI, the first DCI is used to schedule a PUSCH. When the first DCI is scrambled by using a second RNTI, the first DCI is used to schedule a PDSCH. According to the method, DCI of one size may be implicitly used to schedule a plurality of different channels, thereby reducing overheads of the first DCI.

In a possible implementation, a cyclic redundancy check (CRC) bit of the first DCI is scrambled by using a radio network temporary identifier RNTI specific to the terminal device. Optionally, the RNTI specific to the terminal device is any one of the following RNTIs: a C-RNTI, an SPS-RNTI, an MCS-C-RNTI, an SP-CSI-RNTI, and a CS-RNTI. According to the method, it may be implicitly indicated that a type of the first DCI is terminal device-specific, so that the terminal device may determine, by descrambling the DCI, whether the DCI is specific to the terminal.

In a possible implementation, a CRC bit of the second DCI is scrambled by using a common RNTI. Optionally, the common RNTI is any one of the following RNTIs: an SI-RNTI, a P-RNTI, and an RA-RNTI. According to the method, it may be implicitly indicated that a type of the second DCI is common, so that the terminal device may determine the type of the DCI by descrambling the DCI. Optionally, the terminal device may determine, based on an RNTI used to scramble the second DCI, a type of information carried on a PDSCH scheduled by using the second DCI, so that the terminal device may receive the information as required. For example, a PDSCH scheduled by using the second DCI scrambled by using an SI-RNTI carries a system message, a PDSCH scheduled by using the second DCI scrambled by using a P-RNTI carries a paging message, and a PDSCH scheduled by using the second DCI scrambled by using an RA-RNTI carries an RAR.

In a possible implementation, the method further includes: sending indication information to the network device, to indicate a type or capability information of the terminal device. For example, the type of the terminal device is indicated as a REDCAP terminal. Optionally, the type of the terminal device is a REDCAP terminal or a high-capability terminal. Optionally, the capability information of the terminal device includes one or more of the following information: supported maximum bandwidth, a supported quantity of antennas, supported maximum transmit power, whether carrier aggregation is supported, a supported quantity of carriers, a corresponding protocol release, a duplex capability, a data processing capability, and a peak rate. According to the method, when the foregoing DCI alignment method is used for the REDCAP terminal but does not need to be used for the high-capability terminal, it may be convenient for the network device to learn of the type of the terminal device, to perform a corresponding DCI transmission method.

According to a second aspect, a control information transmission method is provided, including: detecting first downlink control information DCI in a first specific search space of a terminal device. The first DCI is used to indicate an active bandwidth part BWP of the terminal device, and the active BWP is used by the terminal device and a network device to transmit a physical data channel. The first specific search space is included in a plurality of specific search spaces of the terminal device, one of the plurality of specific search spaces corresponds to N1 DCI formats, and the plurality of specific search spaces correspond to N2 DCI formats in total. Sizes of DCI in the N2 DCI formats are aligned when the DCI is transmitted in a corresponding specific search space. N1 is an integer greater than or equal to 1, and N2 is an integer greater than or equal to N1.

According to the method, sizes of DCI transmitted in the plurality of specific search spaces of the terminal device are the same, that is, the terminal device is configured to detect one DCI size in the plurality of specific search spaces, that is, one DCI size is configured for the plurality of specific search spaces of the terminal device, so that types of DCI sizes detected by the terminal device may be reduced. In this way, a quantity of times of detecting a PDCCH by the terminal device may be reduced. In addition, the active BWP of the terminal device is indicated in the first DCI, so that a BWP switching function may be implemented, and the terminal device may fully utilize a frequency domain diversity gain when transmitting information. For example, when the method is applied to a terminal device (for example, a REDCAP terminal) with relatively narrow bandwidth, a frequency domain resource may be allocated to the terminal device in a relatively large bandwidth range through BWP switching, to improve data transmission reliability by using a frequency domain diversity gain.

Optionally, that sizes of DCI in the N2 DCI formats are aligned when the DCI is transmitted in a corresponding specific search space includes: When transmitted in the corresponding specific search space, the DCI in the N2 DCI formats is aligned to the size of the second DCI described in the first aspect, or aligned to another size. The another size may be a predefined value, or may be a DCI size corresponding to one of the N2 DCI formats. For example, the DCI size is a smallest DCI size in DCI sizes corresponding to the N2 DCI formats, or a largest DCI size in DCI sizes corresponding to the N2 DCI formats. According to the method, one DCI size may be configured for the plurality of specific search spaces of the terminal device.

In a possible implementation, the physical data channel includes a physical downlink shared channel PDSCH or a physical uplink shared channel PUSCH, and the first DCI is further used to indicate whether the first DCI is used to schedule the PDSCH or used to schedule the PUSCH. According to the method, DCI of one size may be used to schedule a plurality of different channels, thereby implementing more scheduling functions, and enabling a base station and UE to transmit a plurality of channels with low power consumption.

Optionally, for a method for indicating whether the first DCI is used to schedule a PDSCH or used to schedule a PUSCH, refer to the first aspect.

In a possible implementation, a CRC bit of the first DCI is scrambled by using a radio network temporary identifier RNTI specific to the terminal device. For a description of the RNTI specific to the terminal device, refer to the first aspect.

In a possible implementation, the first DCI can also be transmitted in a common search space. For a description of the method, refer to the first aspect.

According to a third aspect, a control information transmission method is provided, including: sending first downlink control information DCI to a terminal device in a first search space.

The first DCI is used to indicate an active bandwidth part BWP of the terminal device, the active BWP is used by the terminal device and a network device to transmit a physical data channel, and a size of the first DCI and a size of second DCI are aligned. The second DCI is DCI that can be transmitted in a first common search space, and the second DCI is used to schedule a system message, a paging message, or a random access response RAR.

The method may alternatively be described as: sending second downlink control information DCI to a terminal device in a first common search space of the terminal device. The second DCI is used to schedule a common message, and a size of the second DCI and a size of first DCI are aligned. The first DCI is DCI that can be transmitted in a first search space, and the first DCI is used to indicate an active bandwidth part BWP of the terminal device. The active BWP is used by the terminal device and a network device to transmit a physical data channel Optionally, the common message may be a system message, a paging message, or a random access response RAR.

For descriptions of the first search space, the first DCI, the second DCI, and the like, refer to the first aspect.

According to a fourth aspect, a control information transmission method is provided, including: sending first downlink control information DCI to a terminal device in a first specific search space of the terminal device. The first DCI is used to indicate an active bandwidth part BWP of the terminal device, and the active BWP is used by the terminal device and a network device to transmit a physical data channel. The first specific search space is included in a plurality of specific search spaces of the terminal device, one of the plurality of specific search spaces corresponds to N1 DCI formats, and the plurality of specific search spaces correspond to N2 DCI formats in total. Sizes of DCI in the N2 DCI formats are aligned when the DCI is transmitted in a corresponding specific search space. N1 is an integer greater than or equal to 1, and N2 is an integer greater than or equal to N1.

For descriptions of the first DCI, an alignment method, and the like, refer to the second aspect.

According to a fifth aspect, an apparatus is provided. The apparatus may be a terminal device, or may be another apparatus that can implement the method described in the first aspect or the second aspect. The another apparatus can be installed in the terminal device, or be matched with the terminal device for use. In an implementation, the apparatus may include a module that performs and one-to-one corresponds to the method/operation/step/action described in the first aspect or the second aspect. The module may be a hardware circuit, or may be software, or may be implemented by a hardware circuit in combination with software. In an implementation, the apparatus may include a processing module and a communications module.

In a possible implementation, the communications module is configured to detect first downlink control information DCI in a first search space. The first DCI is used to indicate an active bandwidth part BWP of the terminal device, the active BWP is used by the terminal device and the network device to transmit a physical data channel, and a size of the first DCI and a size of second DCI are aligned. The second DCI is DCI that can be transmitted in a first common search space, and the second DCI is used to schedule a system message, a paging message, or a random access response RAR. The processing module is configured to process (demodulate, decode, and the like) the received first DCI.

For descriptions of the first search space, the first DCI, the second DCI, and the like, refer to the first aspect.

In a possible implementation, the communications module is configured to detect first downlink control information DCI in a first specific search space of the terminal device. The first DCI is used to indicate an active bandwidth part BWP of the terminal device, and the active BWP is used by the terminal device and the network device to transmit a physical data channel. The first specific search space is included in a plurality of specific search spaces of the terminal device, one of the plurality of specific search spaces corresponds to N1 DCI formats, and the plurality of specific search spaces correspond to N2 DCI formats in total. Sizes of DCI in the N2 DCI formats are aligned when the DCI is transmitted in a corresponding specific search space. N1 is an integer greater than or equal to 1, and N2 is an integer greater than or equal to N1. The processing module is configured to process (demodulate, decode, and the like) the received first DCI.

For descriptions of the first DCI, an alignment method, and the like, refer to the second aspect.

According to a sixth aspect, an apparatus is provided. The apparatus may be a network device, or may be another apparatus that can implement the method described in the third aspect or the fourth aspect. The another apparatus can be installed in the network device, or be matched with the network device for use. In an implementation, the apparatus may include a module that performs and one-to-one corresponds to the method/operation/step/action described in the third aspect or the fourth aspect. The module may be a hardware circuit, or may be software, or may be implemented by a hardware circuit in combination with software. In an implementation, the apparatus may include a processing module and a communications module.

In a possible implementation, the communications module is configured to send first downlink control information DCI to a terminal device in a first search space. The first DCI is used to indicate an active bandwidth part BWP of the terminal device, the active BWP is used by the terminal device and the network device to transmit a physical data channel, and a size of the first DCI and a size of second DCI are aligned. The second DCI is DCI that can be transmitted in a first common search space, and the second DCI is used to schedule a system message, a paging message, or a random access response RAR. The processing module is configured to generate the first DCI.

For descriptions of the first DCI, the second DCI, and the like, refer to the first aspect.

In a possible implementation, the communications module is configured to send first downlink control information DCI to a terminal device in a first specific search space of the terminal device. The first DCI is used to indicate an active bandwidth part BWP of the terminal device, and the active BWP is used by the terminal device and the network device to transmit a physical data channel. The first specific search space is included in a plurality of specific search spaces of the terminal device, one of the plurality of specific search spaces corresponds to N1 DCI formats, and the plurality of specific search spaces correspond to N2 DCI formats in total. Sizes of DCI in the N2 DCI formats are aligned when the DCI is transmitted in a corresponding specific search space. N1 is an integer greater than or equal to 1, and N2 is an integer greater than or equal to N1. The processing module is configured to generate the first DCI.

For descriptions of the first DCI, an alignment method, and the like, refer to the second aspect.

According to a seventh aspect, an embodiment of this application provides an apparatus. The apparatus includes a processor, configured to implement the method described in the first aspect or the second aspect. The apparatus may further include a memory, configured to store instructions. The memory is coupled to the processor, and when the processor executes the instructions stored in the memory, the method described in the first aspect or the second aspect may be implemented. The apparatus may further include a communications interface. The communications interface is used by the apparatus to communicate with another device. For example, the communications interface may be a transceiver, a circuit, a bus, a module, a pin, or another type of communications interface, and the another device may be a network device.

In a possible implementation, the apparatus includes:
the memory, configured to store program instructions; and
the processor, configured to detect first downlink control information DCI in a first search space by using the communications interface. The first DCI is used to indicate an active bandwidth part BWP of a terminal device, the active BWP is used by the terminal device and the network device to transmit a physical data channel, and a size of the first DCI and a size of second DCI are aligned. The second DCI is DCI that can be transmitted in a first common search space, and the second DCI is used to schedule a system message, a paging message, or a random access response RAR. The processor is configured to process (demodulate, decode, and the like) the received first DCI.

For descriptions of the first search space, the first DCI, the second DCI, and the like, refer to the first aspect.

In a possible implementation, the apparatus includes:
the memory, configured to store program instructions; and
the processor, configured to detect first downlink control information DCI in a first specific search space of a terminal device by using the communications interface. The first DCI is used to indicate an active bandwidth part BWP of the terminal device, and the active BWP is used by the terminal device and the network device to transmit a physical data channel. The first specific search space is included in a plurality of specific search spaces of the terminal device, one of the plurality of specific search spaces corresponds to N1 DCI formats, and the plurality of specific search spaces correspond to N2 DCI formats in total. Sizes of DCI in the N2 DCI formats are aligned when the DCI is transmitted in a corresponding specific search space. N1 is an integer greater than or equal to 1, and N2 is an integer greater than or equal to N1. The processor is configured to process (demodulate, decode, and the like) the received first DCI.

For descriptions of the first DCI, an alignment method, and the like, refer to the second aspect.

According to an eighth aspect, an embodiment of this application provides an apparatus. The apparatus includes a processor, configured to implement the method described in the third aspect or the fourth aspect. The apparatus may further include a memory, configured to store instructions. The memory is coupled to the processor, and when the processor executes the instructions stored in the memory, the method described in the third aspect or the fourth aspect may be implemented. The apparatus may further include a communications interface. The communications interface is used by the apparatus to communicate with another device. For example, the communications interface may be a transceiver, a circuit, a bus, a module, a pin, or another type of communications interface, and the another device may be a terminal device.

In a possible implementation, the apparatus includes:
the memory, configured to store program instructions; and
the processor, configured to send first downlink control information DCI to the terminal device in a first search space by using the communications interface. The first DCI is used to indicate an active bandwidth part BWP of the terminal device, the active BWP is used by the terminal device and a network device to transmit a physical data channel, and a size of the first DCI and a size of second DCI are aligned. The second DCI is DCI that can be transmitted in a first common search space, and the second DCI is used to schedule a system message, a paging message, or a random access response RAR. The processor is configured to generate the first DCI.

For descriptions of the first DCI, the second DCI, and the like, refer to the first aspect.

In a possible implementation, the apparatus includes:
the memory, configured to store program instructions; and
the processor, configured to send first downlink control information DCI to the terminal device in a first specific search space of the terminal device by using the communications interface. The first DCI is used to indicate an active bandwidth part BWP of the terminal device, and the active BWP is used by the terminal device and a network device to transmit a physical data channel. The first specific search space is included in a plurality of specific search spaces of the terminal device, one of the plurality of specific search spaces corresponds to N1 DCI formats, and the plurality of specific search spaces correspond to N2 DCI formats in total. Sizes of DCI in the N2 DCI formats are aligned when the DCI is transmitted in a corresponding specific search space. N1 is an integer greater than or equal to 1, and N2 is an integer greater than or equal to N1. The processor is configured to generate the first DCI.

For descriptions of the first DCI, an alignment method, and the like, refer to the second aspect.

According to a ninth aspect, an embodiment of this application provides a communications system, including the apparatus according to the fifth aspect or the seventh aspect, and the apparatus according to the sixth aspect or the eighth aspect.

According to a tenth aspect, an embodiment of this application provides a computer-readable storage medium, including instructions. When the instructions are run on a computer, the computer is enabled to perform the method according to the first aspect, the second aspect, the third aspect, or the fourth aspect.

According to an eleventh aspect, an embodiment of this application provides a computer program product, including instructions. When the instructions are run on a computer, the computer is enabled to perform the method according to the first aspect, the second aspect, the third aspect, or the fourth aspect.

According to a twelfth aspect, an embodiment of this application provides a chip system. The chip system includes a processor, may further include a memory, and is configured to implement the method according to the first aspect, the second aspect, the third aspect, or the fourth aspect. The chip system may include a chip, or include the chip and another discrete device.

DESCRIPTION OF EMBODIMENTS

Figure 1:
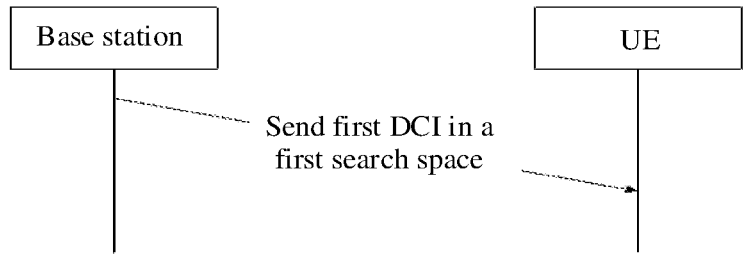
FIG. 1 and FIG. 2 are example flowcharts of a method according to an embodiment of this application.

Technical solutions provided in embodiments of this application may be applied to various communications systems, for example, a long term evolution (LTE) system, a 5th generation (5G) mobile communications system, a wireless fidelity (Wi-Fi) system, a future communications system, or a system in which a plurality of communications systems are integrated. This is not limited in the embodiments of this application. 5G may also be referred to as new radio (NR).

The technical solutions provided in the embodiments of this application may be applied to various communication scenarios, for example, may be applied to one or more of the following communication scenarios: enhanced mobile broadband (eMBB) communication, ultra-reliable low-latency communication (URLLC), machine type communication (MTC), massive machine type communications (mMTC), device-to-device (D2D) communication, vehicle to everything (V2X) communication, vehicle to vehicle (V2V) communication, Internet of Things (IoT), and the like. Optionally, the mMTC may include one or more of the following types of communication: communication in an industrial wireless sensor network (IWSN), communication in a video surveillance scenario, and communication with a wearable device.

The technical solutions provided in the embodiments of this application may be applied to communication between communications devices. The communication between communications devices may include communication between a network device and a terminal device, communication between a network device and a network device, and/or communication between a terminal device and a terminal device. In the embodiments of this application, the term "communication" may also be described as "transmission", "information transmission", "signal transmission", or the like. Transmission may include sending and/or receiving. The communication between a network device and a terminal device is used as an example to describe the technical solutions in the embodiments of this application. A person skilled in the art may also use the technical solutions to perform communication between another scheduling entity and a subordinate entity, for example, communication between a macro base station and a micro base station, or communication between a first terminal device and a second terminal device. The scheduling entity may allocate an air interface resource to the subordinate entity. The air interface resource includes one or more of the following types of resources: a time domain resource, a frequency domain resource, a code resource, and a space resource. In the embodiments of this application, a plurality of types may be two, three, four, or more types. This is not limited in the embodiments of this application.

In the embodiments of this application, the communication between a network device and a terminal device includes: The network device sends a downlink signal or information to the terminal device, and/or the terminal device sends an uplink signal or information to the network device.

In the embodiments of this application, "/" may indicate an "or" relationship between associated objects. For example, A/B may represent A or B. The term "and/or" may be used to describe three relationships between associated objects. For example, A and/or B may represent three cases: There is only A, there are both A and B, and there is only B. A and B may be singular or plural. In the embodiments of this application, terms such as "first" and "second" may be used to distinguish technical features having same or similar functions. The terms such as "first" and "second" do not limit a quantity and an execution sequence, and the terms such as "first" and "second" do not indicate a definite difference. In the embodiments of this application, terms such as "for example" or "for instance" are used to represent examples, instances, or descriptions. An embodiment or an implementation solution described as "for example" or "for instance" should not be interpreted as being preferred or superior to another embodiment or implementation solution. The use of the terms such as "for example" or "for instance" is intended to present a relevant concept in a specific manner for ease of understanding.

The terminal device in the embodiments of this application may also be referred to as a terminal, and may be a device having a wireless transceiver function. The terminal may be deployed on land, including indoors, outdoors, handheld, and/or vehicle-mounted; or may be deployed on water (for example, a ship); or may be deployed in the air (for example, an airplane, a balloon, and a satellite). The terminal device may be user equipment (UE). The UE includes a handheld device, a vehicle-mounted device, a wearable device, or a computing device that has a wireless communication function. For example, the UE may be a mobile phone, a tablet computer, or a computer with the wireless transceiver function. The terminal device may alternatively be a virtual reality (VR) terminal device, an augmented reality (AR) terminal device, a wireless terminal in industrial control, a wireless terminal in unmanned driving, a wireless terminal in telemedicine, a wireless terminal in a smart grid, a wireless terminal in a smart city, a wireless terminal in a smart home, and/or the like.

The network device in the embodiments of this application includes a base station (BS), and may be a device that is deployed in a radio access network and that can perform wireless communication with a terminal device. The base station may be in a plurality of forms, for example, a macro base station, a micro base station, a relay node, or an access point. The base station in the embodiments of this application may be a base station in a 5G system or a base station in an LTE system. The base station in the 5G system may also be referred to as a transmission reception point (TRP) or a next-generation NodeB (generation Node B, gNB or gNodeB).

In a communications system, for example, an NR system or another system, a light terminal device may be introduced compared with a conventional terminal device, for example, an eMBB terminal. The light terminal device may also be referred to as a reduced capability (REDCAP) terminal. The eMBB terminal is a terminal that can transmit an eMBB service. Compared with the REDCAP terminal, the conventional terminal device may be a high-capability terminal or a terminal with an unlimited capability. In the embodiments of this application, the conventional terminal device may be replaced with a high-capability terminal that is introduced in the future and that is relative to the REDCAP terminal. For example, feature comparison between the high-capability terminal and the REDCAP terminal meets at least one of the following items 1 to 9. The at least one item may be one or more items, for example, two, three, or more items. This is not limited in the embodiments of this application.

Item 1: Maximum bandwidth supported by the high-capability terminal is greater than maximum bandwidth supported by the REDCAP terminal. For example, the maximum bandwidth supported by the high-capability terminal is 100 megahertz (MHz) or 200 MHz, and the maximum bandwidth supported by the REDCAP terminal is 20 MHz, 10 MHz, or 5 MHz.

Item 2: A quantity of antennas of the high-capability terminal is greater than a quantity of antennas of the REDCAP terminal. The quantity of antennas may be a quantity of antennas disposed for the terminal, or a maximum quantity of antennas used for sending and/or receiving. For example, the high-capability terminal supports a maximum of four receive antennas and two transmit antennas, and the REDCAP terminal supports a maximum of two receive antennas and one transmit antenna. Alternatively, even if the quantity of antennas of the high-capability terminal is equal to the quantity of antennas of the NR REDCAP terminal, the high-capability terminal and the NR REDCAP terminal have different capabilities in antenna selective transmission. For example, both the high-capability terminal and a low-capability terminal support two transmit antennas, but the high-capability terminal supports antenna selective transmission, and the low-capability terminal does not support antenna selective transmission. Using single-antenna port data transmission as an example, the high-capability terminal may implement switching between two transmit antennas for single-antenna port data transmission, and a space diversity gain may be obtained for the data transmission. However, single-antenna port data transmission of the low-capability terminal can only be simultaneously performed on two transmit antennas. This is equivalent to transmission performance of one transmit antenna.

Item 3: Maximum transmit power supported by the high-capability terminal is greater than maximum transmit power supported by the REDCAP terminal. For example, the maximum transmit power supported by the high-capability terminal is 23 decibel-milliwatts (dBm) or 26 dBm, and the maximum transmit power supported by the REDCAP terminal is a value from 4 dBm to 20 dBm.

Item 4: The high-capability terminal supports carrier aggregation (CA), and the REDCAP terminal does not support carrier aggregation.

Item 5: When both the high-capability terminal and the REDCAP terminal support carrier aggregation, a maximum quantity of carriers supported by the high-capability terminal is greater than a maximum quantity of carriers supported by the REDCAP terminal. For example, the high-capability terminal supports aggregation of a maximum of 32 carriers or five carriers, and the REDCAP terminal supports aggregation of a maximum of two carriers.

Item 6: The high-capability terminal and the REDCAP terminal are introduced in different protocol releases. For example, in an NR protocol, the high-capability terminal is a terminal introduced in Release® 15 of the protocol, and the REDCAP terminal is a terminal introduced in R17 of the protocol.

Item 7: The high-capability terminal and the REDCAP terminal have different duplex capabilities. The high-capability terminal has a stronger duplex capability. For example, the high-capability terminal supports full-duplex frequency division duplex (FDD), that is, the high-capability terminal supports simultaneous receiving and sending when supporting FDD; and the REDCAP terminal supports half-duplex FDD, that is, the REDCAP terminal does not support simultaneous receiving and sending when supporting 1-DD.

Item 8: A data processing capability of the high-capability terminal is greater than a data processing capability of the REDCAP terminal. The high-capability terminal may process more data within a same time, or the high-capability terminal requires a shorter processing time when processing same data. For example, a time at which a terminal receives downlink data from a network device is denoted by T1, and a time at which the terminal sends a feedback of the downlink data to the network device after the terminal processes the downlink data is denoted by T2. A latency (time difference) between T2 and T1 of the high-capability terminal is less than a latency between T2 and T1 of the REDCAP terminal. The feedback of the downlink data may be an ACK or NACK feedback.

Item 9: A peak rate of data transmission of the high-capability terminal is greater than a peak rate of data transmission of the REDCAP terminal. The data transmission includes uplink data transmission (that is, the terminal sends data to the network device) and/or downlink data transmission (that is, the terminal receives data from the network device).

Optionally, for ease of distinguishing, in the embodiments of this application, the high-capability terminal may also be referred to as a non-REDCAP terminal.

The REDCAP terminal may be applied to various scenarios, such as Internet of Things, mMTC, or V2X. In a possible implementation, the REDCAP terminal is required to have lower power consumption compared with the high-capability terminal. The lower power consumption of the REDCAP terminal leads to a longer battery life of the REDCAP terminal and better user experience. In addition, some REDCAP terminals are deployed in a special environment (for example, an underground pipeline or a suburban area), and it is not convenient to adjust a power supply system of the REDCAP terminals in the environment. In this case, reducing power consumption of the REDCAP terminals may simplify post-maintenance of such terminals and improve user experience. Therefore, how to reduce the power consumption of the REDCAP terminal is a problem worth studying.

Optionally, in the embodiments of this application, the terminal device may send indication information to the network device, to indicate a type or capability information of the terminal device. Optionally, whether the type of the terminal is a REDCAP terminal or a high-capability terminal may be indicated. Optionally, one or more of the following capability information of the terminal may be indicated: supported maximum bandwidth, a supported quantity of antennas, supported maximum transmit power, whether carrier aggregation is supported, a supported quantity of carriers, a corresponding protocol release, a duplex capability, a data processing capability, and a peak rate. Based on the implementation, for example, when a method provided in the embodiments of this application may be applied to a REDCAP terminal but not to another high-capability terminal, the network device may obtain a type of the terminal device by using the indication information, and therefore may perform a correct operation, so that the network device and the terminal device may normally exchange information.

Optionally, the method provided in the embodiments of this application may also be applied to another type of terminal, such as a high-capability terminal (for example, an eMBB terminal or a URLLC terminal supporting a URLLC service), to reduce power consumption of the terminal and further improve user experience. To simplify description, the REDCAP terminal may be used as an example for description in the embodiments of this application.

In the embodiments of this application, an apparatus configured to implement a function of a terminal device may be a terminal device, or may be an apparatus that can support the terminal device in implementing the function, for example, a chip system. The apparatus can be installed in the terminal device, or be matched with the terminal device for use. In the embodiments of this application, the chip system may include a chip, or include the chip and another discrete device. In the technical solutions provided in the embodiments of this application, an example in which the apparatus configured to implement a function of a terminal device is a terminal device, and the terminal device is UE is used to describe the technical solutions provided in the embodiments of this application.

In the embodiments of this application, an apparatus configured to implement a function of a network device may be a network device, or may be an apparatus that can support the network device in implementing the function, for example, a chip system. The apparatus can be installed in the network device, or be matched with the network device for use. In the technical solutions provided in the embodiments of this application, an example in which the apparatus configured to implement a function of a network device is a network device, and the network device is a base station is used to describe the technical solutions provided in the embodiments of this application.

In a communications system, UE may access a base station and communicate with the base station. For example, one base station may manage one or more (for example, two, three, or six) cells, and UE may access the base station in at least one of the one or more cells, and communicate with the base station in the cell accessed by the UE. In the embodiments of this application, the at least one may be one, two, three, or more. This is not limited in the embodiments of this application.

When the base station communicates with the UE, the base station may send downlink control information (DCI) to the UE by using a downlink control channel, to schedule a physical data channel. For example, the DCI may be used to schedule a physical downlink data channel, and the base station sends downlink data to the UE by using the physical downlink data channel. Alternatively, the DCI may be used to schedule a physical uplink data channel, and the UE sends uplink data to the base station by using the physical uplink data channel.

In the embodiments of this application, the downlink control channel may be a physical downlink control channel (PDCCH), an enhanced PDCCH, an MTC PDCCH (MPDCCH), a narrowband PDCCH (NPDCCH), or another type of downlink control channel, and is used to carry the DCI. A name or a type of the downlink control channel is not limited in the embodiments of this application. To simplify description, in the embodiments of this application, description is provided by using an example in which the downlink control channel is a PDCCH.

When the physical data channel is scheduled by using the DCI, to perform data transmission, the UE needs to receive the DCI from the base station. When receiving the DCI, the UE may need to blindly detect the DCI for a plurality of times. A larger quantity of blind detection times leads to higher power consumption of the UE. To reduce the power consumption of the UE, a quantity of times of blindly detecting the DCI by the UE may be reduced. To reduce the quantity of times of blindly detecting the DCI by the UE, types of DCI sizes may be reduced. Based on this, the embodiments of this application provide the following implementation solutions.

First implementation solution: A size of common DCI transmitted in a first common search space is aligned with a size of first DCI transmitted in a first search space. The first DCI is used to indicate an active bandwidth part (BWP) of the UE.

In a possible implementation, as shown in FIG. 1, the base station sends the first DCI to the UE in the first search space. The first DCI is used to indicate the active BWP of the UE. The size of the first DCI and a size of second DCI are the same. The second DCI is DCI that can be transmitted in the first common search space, and the second DCI is used to schedule a common message. The first DCI may be further used to schedule a physical data channel, for example, a physical downlink data channel or a physical uplink data channel. The physical data channel scheduled by using the first DCI is transmitted on the active BWP of the UE. Optionally, the first search space is a first specific search space of the UE. Optionally, the base station may send the second DCI to the UE in the first common search space, that is, the first search space may alternatively be the first common search space. In some embodiments of this application, to simplify description, description may be provided by using an example in which the first search space is the first specific search space.

In the embodiments of this application, the physical downlink data channel may be a physical downlink shared channel (PDSCH) or another downlink data channel, and is used to carry downlink data sent by the base station to the UE. A name or a type of the physical downlink data channel is not limited in the embodiments of this application. To simplify description, in the embodiments of this application, description is provided by using an example in which the physical downlink data channel is a PDSCH. DCI used to schedule the PDSCH is carried on a PDCCH and sent by the base station to the UE. When the DCI is used to schedule the PDSCH, the DCI may indicate a transmission parameter of the PDSCH, and the transmission parameter is used by the UE to receive the PDSCH. The transmission parameter may include one or more of transmission parameters included in the following DCI format 1_0 and/or DCI format 1_1.

In the embodiments of this application, the physical uplink data channel may be a physical uplink shared channel (PUSCH) or another uplink data channel, and is used to carry uplink data sent by the UE to the base station. A name or a type of the physical uplink data channel is not limited in the embodiments of this application. To simplify description, in the embodiments of this application, description is provided by using an example in which the physical uplink data channel is a PUSCH. DCI used to schedule the PUSCH is carried on a PDCCH and sent by the base station to the UE. When the DCI is used to schedule the PUSCH, the DCI may indicate a transmission parameter of the PUSCH, and the transmission parameter is used by the UE to send the PUSCH. The transmission parameter may include one or more of transmission parameters included in the following DCI format 0_0 and/or DCI format 0_1.

In the embodiments of this application, two types of DCI may be set for transmission directions scheduled by using DCI.

For example, DCI for scheduling a PUSCH may be referred to as first-type DCI, and DCI for scheduling a PDSCH may be referred to as second-type DCI. A format of the first-type DCI may include the DCI format 0_0 or the DCI format 0_1 described below, or another format of first-type DCI. A format of the second-type DCI may include the DCI format 1_0 or the DCI format 1_1 described below, or another format of second-type DCI. The DCI format 0_0 may also be referred to as DCI 0_0 for short, the DCI format 0_1 may also be referred to as DCI 0_1 for short, the DCI format 1_0 may also be referred to as DCI 1_0 for short, and the DCI format 1_1 may also be referred to as DCI 1_1 for short. A format of the first-type DCI in the another format is different from the DCI format 0_0 or the DCI format 0_1, and the first-type DCI in the another format may include one or more of the transmission parameters included in the DCI format 0_0 and/or the DCI format 0_1. A format of the second-type DCI in the another format is different from the DCI format 1_0 or the DCI format 1_1, and the second-type DCI in the another format may include one or more of the transmission parameters included in the DCI format 1_0 and/or the DCI format 1_1. For the PDSCH or the PUSCH, fallback DCI and non-fallback DCI may be designed. For example, a format of fallback DCI for the PUSCH is DCI 0_0, a format of non-fallback DCI for the PUSCH is DCI 0_1, a format of fallback DCI for the PDSCH is DCI 1_0, and a format of non-fallback DCI for the PDSCH is DCI 1_1. Types of information indicated by the non-fallback DCI are more than types of information indicated by the fallback DCI, and the non-fallback DCI supports more functions. For example, as shown in Table 1, the fallback DCI does not support bandwidth part (BWP) switching, and the non-fallback DCI supports BWP switching.

TABLE 1

|  | DCI Format | Whether BWP Switching Is Supported |
| --- | --- | --- |
| PDSCH | 1_0 | Not supported |
|  | 1_1 | Supported |
| PUSCH | 0_0 | Not supported |
|  | 0_1 | Supported |

The following sequentially describes a BWP, BWP switching, specific content of DCI formats, a search space, and the like in the embodiments of this application.

BWP and BWP Switching

In the embodiments of this application, one cell may correspond to one downlink carrier. One cell may be equivalent to one downlink carrier. For example, one cell may correspond to one downlink carrier and one uplink carrier. Alternatively, one cell may correspond to one downlink carrier, one uplink carrier, and one supplementary uplink (SUL) carrier. For example, in an LTE system, one cell may correspond to one downlink carrier and one uplink carrier. For example, in an NR system, one cell may correspond to one downlink NR carrier and one uplink NR carrier. Alternatively, one cell may correspond to one downlink NR carrier, one uplink NR carrier, and one SUL carrier. The UE may send an uplink signal to the base station on an NR carrier based on an NR technology. The SUL carrier may be considered as a carrier shared by the NR system and the LTE system. The UE may send an uplink signal to the base station on the SUL carrier based on the NR technology or an LTE technology.

One carrier, for example, one uplink carrier or one downlink carrier, may correspond to a segment of frequency resources in frequency domain. A center frequency and a frequency domain range of the carrier may be set, or a start frequency and an end frequency of the carrier may be set. For an FDD system, the downlink carrier and the uplink carrier are carriers with different frequency ranges. For a time division duplex (TDD) system, a carrier may be configured as an uplink carrier or a downlink carrier in a time division manner.

A BWP or a BWP pair may be configured for the UE in a carrier. The method in the embodiments of this application may be used for both a BWP pair-based design and a BWP-based design.

In the embodiments of this application, in the BWP pair-based design, one BWP may be used to perform downlink signal transmission or uplink signal transmission, but cannot be used to perform both downlink signal transmission and uplink signal transmission. In the design, when the base station communicates with the UE on a carrier, one or more BWP pairs may be configured for the UE from a resource of the carrier, to be used for communication between the base station and the UE. One BWP pair may include at least one downlink BWP and at least one uplink BWP. For example, one BWP pair includes one downlink BWP and one uplink BWP. Alternatively, one BWP pair includes one downlink BWP, one uplink BWP, and one supplementary uplink (SUL) BWP. One BWP, for example, one downlink BWP or one uplink BWP, may include a segment of consecutive frequency domain resources, for example, one or more consecutive subcarriers, resource blocks (RB), or resource block groups (RBG). For each BWP, the base station may configure one or more of the following parameters of the BWP for the UE: a frequency domain resource location, a BWP identifier (ID), a subcarrier spacing, and a cyclic prefix (CP) type.

When the base station communicates with the UE on a BWP pair, downlink signal transmission is performed on a downlink BWP of the BWP pair, and uplink signal transmission is performed on an uplink BWP of the BWP pair. For example, the base station sends a paging message, a synchronization signal, a broadcast channel, a PDCCH, a PDSCH, a downlink reference signal, and the like to the UE on the downlink BWP; and/or the UE sends a PUSCH, a PUCCH, an uplink reference signal, and the like to the base station on the uplink BWP. In the embodiments of this application, the synchronization signal and the broadcast channel may be included in a synchronization signal block (SSB).

Optionally, the base station may configure one or more (for example, two, three, four, or another quantity of) candidate BWP pairs for the UE. When configuring a plurality of candidate BWP pairs for the UE, the base station may configure at least one active BWP pair for the UE from the plurality of candidate BWP pairs. For example, the base station may indicate, by using a BWP indicator field in DCI, a BWP pair activated for the UE from the plurality of candidate BWP pairs. For another example, when one piece of DCI is used to schedule a PDSCH, the DCI may include a BWP indicator field, which is used to indicate a downlink BWP activated for the UE from a plurality of downlink BWPs of the plurality of candidate BWP pairs of the UE, and/or when one piece of DCI is used to schedule a PUSCH, the DCI may include a BWP indicator field, which is used to indicate an uplink BWP activated for the UE from a plurality of uplink BWPs of the plurality of candidate BWP pairs of the UE.

In the embodiments of this application, in the BWP-based design, one BWP may be used to perform both downlink signal transmission and uplink signal transmission. In the design, when the base station communicates with the UE on a carrier, one or more BWPs may be configured for the UE from a resource of the carrier, to be used for communication between the base station and the UE. One BWP may include a segment of consecutive frequency domain resources, for example, one or more consecutive subcarriers, RBs, or RBGs. The BWP may include an uplink part and/or a downlink part. For each BWP, the base station may configure one or more of the following parameters of the BWP for the UE: a frequency domain resource location, a BWP ID, a subcarrier spacing, and a CP type.

For example, for one BWP, when the base station communicates with the UE on the BWP, if the BWP includes a downlink part, the base station sends a paging message, a synchronization signal, a broadcast channel, a PDCCH, a PDSCH, and a downlink reference signal to the UE on the downlink part of the BWP; and/or if the BWP includes an uplink part, the UE sends a PUSCH, a PUCCH, an uplink reference signal, and the like to the base station on the uplink part of the BWP.

Optionally, the base station may configure one or more candidate BWPs for the UE. When configuring a plurality of candidate BWPs for the UE, the base station may configure at least one active BWP for the UE from the plurality of candidate BWPs. The active BWP is used by the base station and the UE to perform data transmission. For example, the base station may indicate, by using a BWP indicator field included in DCI, a BWP activated for the UE from the plurality of candidate BWPs.

An active BWP (pair) can be used by the base station and the UE to perform data transmission, and an inactive BWP (pair) cannot be used by the base station and the UE to perform data transmission. For example, the active BWP (pair) can be used by the base station and the UE to transmit a PDCCH, a PDSCH, a PUSCH, a PUCCH, and the like, and the inactive BWP (pair) cannot be used to transmit these channels. Optionally, the UE may perform radio resource management (radio resource management, RRM) measurement on the inactive BWP (pair). For example, the UE may measure reference signal received power (RSRP) or reference signal received quality (RSRQ) based on a reference signal such as an SSB or a channel state information-reference signal (CSI-RS). The active BWP (pair) of the UE may be indicated, so that switching of the active BWP (pair) of the UE may be implemented, and a frequency diversity gain may be fully utilized.

Working modes of the BWP pair-based design and the BWP-based design are similar, and main differences are described above. To simplify description, the BWP-based design is used as an example for description in the embodiments of this application.

In the embodiments of this application, bandwidth of the active BWP of the UE may be less than or equal to a bandwidth capability of the UE, or may be greater than the bandwidth capability of the UE. This is not limited in the embodiments of this application. The bandwidth capability of the UE may be expressed as maximum bandwidth (including a guard band) that may be simultaneously used by the UE and the base station during data transmission. For example, the bandwidth capability of the UE may be 20 MHz, 10 MHz, or 5 MHz.

Specific Content of DCI Formats

In the embodiments of this application, a DCI format is used to define a type of an information field included in DCI, and is used to define a length of each information field in the DCI. A length of an information field in the DCI refers to a quantity of bits included in the information field.

For example, DCI 1_0 includes one or more of the following information fields. A name of DCI 1_0 is not limited in the embodiments of this application. For example, DCI 1_0 may also be referred to as a downlink fallback DCI format, a first DCI format, or DCI 4_0. This is not limited in the embodiments of this application.

(1) Identifier for DCI formats field: A value is set to 1, indicating that the DCI is in a downlink DCI format, that is, used to schedule a PDSCH.

In the embodiments of this application, a size or a length of an information field may be understood as a quantity of bits included in the information field.

(2) Frequency domain resource allocation field: is used to indicate a frequency domain resource allocated to the PDSCH.

(3) Time domain resource allocation field: is used to indicate a time domain resource allocated to the PDSCH.

(4) Mapping field from a virtual RB (virtual resource block, VRB) to a physical RB (physical resource block, PRB): is used to indicate whether the frequency domain resource allocated to the PDSCH is allocated in a centralized resource allocation manner or a distributed resource allocation manner.

(5) Modulation and coding scheme (MCS) field: is used to indicate a modulation mechanism and a coding mechanism (for example, a code rate) of the PDSCH.

(6) New data indicator (NDI) field: is used to indicate whether downlink data transmitted on the PDSCH is newly transmitted or retransmitted.

(7) Redundancy version (RV) field: is used to indicate a redundancy version of the PDSCH.

(8) hybrid automatic repeat request (HARQ) process number (HPN) field: is used to indicate a HARQ process number of the PDSCH.

(9) Downlink assignment index (DAI) field: is used to indicate that the PDSCH is transmitted in a plurality of downlink transmission time units in a HARQ-based PDSCH transmission window. The transmission time unit may be a time unit such as a transmission time interval, a timeslot, or a subframe. This is not limited in the embodiments of this application.

(10) Transmit power control (TPC) command for a scheduled PUCCH field: is used to control transmit power when the UE sends the PUCCH.

(11) PUCCH resource indicator field: is used to indicate an uplink transmission resource required by the UE to send uplink control information. The uplink control information may include an acknowledgement (ACK)/negative acknowledgement (NACK) of the PDSCH, and/or channel state information (CSI). The uplink transmission resource may include a time-frequency resource and a PUCCH format type to be used. Different PUCCH formats may be distinguished by using a quantity of symbols occupied by the PUCCH in terms of time, a sequence form used to transmit the uplink control information, and orthogonal manners of different sequences.

(12) PDSCH-to-HARQ feedback timing indicator field: is used to indicate a relationship between a time at which the UE sends a HARQ feedback of the PDSCH to the base station and a time at which the UE receives the PDSCH from the base station.

(13) Reserved bit field: includes one or more bits.

For example, in addition to the information fields included in DCI 1_0, DCI 1_1 includes one or more of the following information fields. A name of DCI 1_1 is not limited in the embodiments of this application. For example, DCI 1_1 may also be referred to as a downlink non-fallback DCI format, a second DCI format, or a DCI format 4_1. This is not limited in the embodiments of this application.

(1) Carrier indicator field: is used to indicate a carrier on which the frequency domain resource allocated to the PDSCH is located. Cross-carrier scheduling may be implemented by using the information field, that is, a carrier carrying control information for scheduling the PDSCH is different from a carrier carrying the PDSCH.

(2) BWP indicator field: is used to indicate an active BWP of the UE. The frequency domain resource allocated to the PDSCH is on the active BWP. Cross-BWP scheduling may be implemented by using the information field, that is, a BWP carrying control information for scheduling the PDSCH is different from a BWP carrying the PDSCH.

(3) MCS fields, NDI fields, and RV fields corresponding to more transport blocks (transmission block, TB): For example, DCI 1_0 may include an MCS field, an NDI field, and an RV field that are corresponding to one transport block, and DCI 1_1 may be used to indicate MCS fields, NDI fields, and RV fields that are respectively corresponding to two transport blocks.

(4) Antenna port indicator field: indicates an antenna port corresponding to a demodulation reference signal (DMRS) used to demodulate the PDSCH.

(5) Transmission configuration indicator field: is used to indicate a quasi co-location (QCL) relationship between different reference signals or between different transport channels. The reference signals may include a synchronization signal block SSB, a demodulation reference signal (DMRS), a CSI-RS, a phase tracking reference signal (PTRS), and the like. The transport channels may be, for example, a PDCCH and a PDSCH.

(6) Code block group (CBG) transmission information (CBGTI) field: is used to indicate transmission information of a code block included in a transport block TB scheduled by using the DCI.

(7) CBG flushing out information (CBGFI) field: is used to indicate CBGs on which combined receiving processing may be performed and CBGs on which combined receiving processing cannot be performed.

In the embodiments of this application, in DCI 1_1 and the following DCI 0_1, a field used to indicate the active BWP may be the BWP indicator field, or may be a field with another name. This is not limited in the embodiments of this application. For example, the base station may reuse some or all bits in the DAI field to indicate the active BWP of the UE, or the base station may use a redundancy status of the frequency domain resource allocation field to indicate the active BWP of the UE.

For example, DCI 0_0 is used to schedule uplink data transmission, and includes one or more of the following information fields. A name of DCI 0_0 is not limited in the embodiments of this application. For example, DCI 0_0 may also be referred to as an uplink fallback DCI format, a third DCI format, or DCI 3_0. This is not limited in the embodiments of this application.

(1) Identifier for DCI formats field: A value is set to 0, indicating that the DCI is in an uplink DCI format, that is, used to schedule a PUSCH.

(2) Frequency domain resource allocation field: is used to indicate a frequency domain resource allocated to the PUSCH.

(3) Time domain resource allocation field: is used to indicate a time domain resource allocated to the PUSCH.

(4) Frequency hopping identifier field: is used to indicate whether the UE transmits the PUSCH in a frequency hopping manner.

(5) MCS field: is used to indicate a modulation mechanism and a coding mechanism (for example, a code rate) of the PUSCH.

(6) NDI field: is used to indicate whether uplink data transmitted on the PUSCH is newly transmitted or retransmitted.

(7) RV field: is used to indicate a redundancy version of the PUSCH.

(8) HPN field: has a meaning similar to the meaning in DCI 1_0. The PDSCH is replaced with the PUSCH.

(9) Transmit power control command for a scheduled PUSCH (TPC command for scheduled PUSCH) field: is used to control transmit power when the UE sends the PUSCH.

(10) Uplink/supplementary uplink (SUL) indicator field: is used to indicate whether the scheduled PUSCH is carried on an uplink carrier or a supplementary uplink carrier.

For example, in addition to the information fields included in DCI 0_0, DCI 0_1 includes one or more of the following information fields. A name of DCI 0_1 is not limited in the embodiments of this application. For example, DCI 0_1 may also be referred to as an uplink non-fallback DCI format, a fourth DCI format, or DCI 3_1. This is not limited in the embodiments of this application.

(1) Carrier indicator field: is used to indicate a carrier on which the frequency domain resource allocated to the PUSCH is located. Cross-carrier scheduling may be implemented by using the information field, that is, a carrier carrying control information for scheduling the PUSCH is different from a carrier carrying the PUSCH.

(2) Bandwidth part indicator field: is used to indicate an active BWP of the UE. The frequency domain resource allocated to the PUSCH is on the active BWP. Cross-BWP scheduling may be implemented by using the information field, that is, a BWP carrying control information for scheduling the PUSCH is different from a BWP carrying the PUSCH.

(3) DAI field: is similar to the DAI field in the DCI format 1_0. The PDSCH is replaced with the PUSCH.

(4) Sounding reference signal (SRS) resource indicator field: is used to indicate a resource of an SRS. The SRS may be sent by the UE to the base station.

(5) Precoding information and number of layers indicator field: is used to indicate precoding information and a quantity of transport layers of the PUSCH.

(6) Antenna port indicator field: is used to indicate an antenna port of a DMRS of the PUSCH.

(7) SRS request indicator field: is used to trigger the UE to send an aperiodic SRS.

(8) Channel state information (CSI) request indicator field: is used to trigger the UE to send CSI.

(9) CBGTI field: is similar to the CBGTI field in the DCI format 1_1. The PDSCH is replaced with the PUSCH.

In a method shown in FIG. 1, a size of first DCI is set to be aligned with a size of second DCI. A format of the first DCI may be the foregoing DCI 0_1 or DCI 1_1, or may be another format of DCI. This is not limited in the embodiments of this application. The DCI in the another format is used to indicate an active BWP of the UE, and has a BWP switching function. The DCI in the another format may include one or more parameters in DCI 0_0, DCI 0_1, DCI 1_0, and/or DCI 1_1. This is not limited in the embodiments of this application.

After the first DCI indicates the active BWP of the UE, before the base station uses other DCI (which may be in the same format as the first DCI, or may be DCI that is in another format and that can indicate an active BWP) to update the active BWP of the UE, the base station and the UE may transmit a PDSCH and/or a PUSCH on the active BWP indicated by the first DCI. If the first DCI is further used to schedule a physical data channel, the physical data channel is transmitted on the active BWP indicated by the first DCI.

A format of the second DCI in the method shown in FIG. 1 may be the foregoing DCI 0_0 or DCI 1_0, or may be another format of DCI. This is not limited in the embodiments of this application. The DCI in the another format is not used to indicate the active BWP of the UE, and does not have the BWP switching function. The DCI in the another format may include one or more parameters in DCI 0_0, DCI 0_1, DCI 1_0, and/or DCI 1_1. This is not limited in the embodiments of this application.

Search Space

In the embodiments of this application, one or more search spaces may be configured for the UE. For a search space, the search space may include one or more parameters, and any parameter of the search space may be predefined in a protocol or indicated by the base station to the UE by using signaling. Configuration manners of different parameters of a same search space may be the same or different, and configuration manners of parameters of different search spaces may be the same or different. This is not limited in the embodiments of this application.

The search space of the UE may be configured (indicated) by the base station for the UE by using signaling, or may be predefined. On one BWP or one carrier of the UE, one or more search spaces may be configured for the UE.

In the embodiments of this application, unless otherwise specified, signaling sent by the base station to the UE may be any one of the following signaling: a broadcast message, system information, radio resource control (RRC) signaling, media access control (MAC) control element (CE), or DCI.

For a search space, whether a type of the search space is a common search space (CSS) or a UE-specific search space (USS) may be configured in a predefined manner or a manner of being indicated by the base station to the UE by using signaling. For UE, feature comparison between the common search space and the UE-specific search space is as follows: DCI transmitted in the common search space is common DCI, and the common DCI is specific to all UEs in a cell in which the UE is located; or the common DCI is specific to a group of UEs in which the UE is located, and the group of UEs are some UEs in the cell; and DCI transmitted in the UE-specific search space is UE-specific DCI, and the specific DCI is specific to the UE. Further, the common search space may be configured to allow transmission of the UE-specific DCI.

In the method shown in FIG. 1, the second DCI is common DCI.

In the embodiments of this application, a cyclic redundancy check (CRC) bit of the common DCI may be scrambled by the base station based on a common radio network temporary identifier (RNTI). Correspondingly, when detecting the common DCI, the UE attempts to descramble the DCI by using the common RNTI. If the descrambling is correct, it is considered that the common DCI is received. The common RNTI may be learned of by the UE, for example, is predefined in a protocol, or is indicated by the base station to the UE in advance. In the embodiments of this application, the common RNTI includes but is not limited to a system information RNTI (SI-RNTI), a paging RNTI (paging radio network temporary identifier, P-RNTI), or a random access RNTI (RA-RNTI).

In the embodiments of this application, the common DCI may be used to schedule common information. The common information may be carried on a physical data channel scheduled by using the common DCI. The common information includes but is not limited to a system message, a paging message, or a random access response (RAR).

For example, for common DCI, a CRC bit of the DCI is scrambled based on an SI-RNTI, a PDSCH scheduled by using the DCI carries a system information block (SIB), and the SIB is used to broadcast a system message to UE in a cell; a CRC bit of the DCI is scrambled based on a P-RNTI, a PDSCH scheduled by using the DCI carries a paging message, and the paging message is used to page a group of UEs; or a CRC bit of the DCI is scrambled based on an RA-RNTI, and a PDSCH scheduled by using the DCI carries an RAR.

In the method shown in FIG. 1, the first DCI is UE-specific DCI. In the embodiments of this application, a CRC bit of the UE-specific DCI may be scrambled by the base station based on an RNTI specific to the UE. Correspondingly, when detecting the specific DCI, the UE attempts to descramble the DCI by using the UE-specific RNTI. If the descrambling is correct, it is considered that the UE-specific DCI is received. The UE-specific RNTI includes but is not limited to a cell radio network temporary identifier (C-RNTI), a semi-persistent scheduling (SPS)-RNTI, an MCS-C-RNTI, a semi-persistent channel state information (SP-CSI)-RNTI, or a configured scheduling (CS)-RNTI.

In the embodiments of this application, one or more common search spaces may be configured, and the first common search space may be one or more (e.g., some or all) common search spaces in a plurality of common search spaces. One or more UE-specific search spaces may be configured for the UE. This is not limited in the embodiments of this application. The first specific search space may be one or more specific search spaces in a plurality of specific search spaces of the UE.

In the embodiments of this application, the UE-specific DCI may also be set to be transmitted in a common search space. For example, the first DCI may be set to be transmitted in a second common search space. That is, the first search space may be the second common search space. The second common search space may be the same as or different from the first common search space. This is not limited in the embodiments of this application. When DCI that is of one size and that may be scrambled by using a plurality of different RNTIs is transmitted in a search space, the UE may obtain a type of the DCI by descrambling the DCI. For example, in the second common search space, the base station can send, to the UE, specific DCI scrambled by using a specific RNTI and common DCI scrambled by using a common RNTI. When blindly detecting DCI, the UE may obtain, by descrambling the DCI, an RNTI used to scramble the DCI, and therefore may determine whether the DCI is UE-specific DCI or common DCI.

For a search space, one or more of the following parameters of the search space may be configured in a predefined manner or a manner of being indicated by the base station to the UE by using signaling: a frequency domain resource location, an aggregation level size, a quantity of candidate PDCCHs, a detection period, a time domain resource location, a format of DCI corresponding to the search space (that is, a format of DCI that may be transmitted in the search space), and a size of DCI transmitted in the search space. The time domain resource location includes: an offset of a first time unit (for example, a timeslot) of the search space in the detection period, a quantity of consecutive first time units occupied by the search space in the detection period, an offset of a second time unit (for example, a symbol) of the search space in each first time unit, and a quantity of second time units occupied by the search space in each first time unit.

Optionally, the frequency domain resource location of the search space and the quantity of second time units of the search space in each first time unit may be configured in the following manner. The base station indicates, to the UE, a control resource set (CORESET) corresponding to the search space. A parameter of the CORESET may be considered as a parameter of the search space.

For a CORESET, a frequency domain resource location of the CORESET and a quantity of second time units of the CORESET in each first time unit may be configured in a predefined manner or a manner of being indicated by the base station to the UE by using signaling. Optionally, one CORESET may correspond to one search space, or may correspond to a plurality of different search spaces. This is not limited in the embodiments of this application.

For example, a search space A corresponds to a CORESET A, and the CORESET A occupies three symbols in time domain. A detection period of the search space A is 10 timeslots, an offset of the search space A in the detection period is three timeslots, the search space A occupies two consecutive timeslots in the detection period, and a symbol offset of the search space A in each timeslot is three symbols. In this case, a time domain location of the search space A is a fourth symbol to a sixth symbol in a fourth timeslot and a fifth timeslot in every 10 timeslots. That is, in every 10 timeslots, a time domain location in which the search space A is located is a fourth symbol to a sixth symbol in a fourth timeslot, and a fourth symbol to a sixth symbol in a fifth timeslot. A frequency domain resource of the search space A is the same as a frequency domain resource of the CORESET A.

In the method shown in FIG. 1, a size of DCI (the first DCI) transmitted in the first search space of the UE is the same as a size of DCI (the second DCI) transmitted in the first common search space of the UE, that is, a same DCI size is configured for the first search space and the first common search space, so that a quantity of times of blindly detecting a PDCCH by the UE may be reduced.

For example, the first search space is the first specific search space. When the UE detects DCI in the first specific search space or the first common search space, the UE does not know whether the base station sends DCI in the search space, or how many pieces of DCI of a corresponding type are sent by the base station. In addition, if the search space corresponds to DCI of a plurality of sizes, for example, corresponds to a plurality of DCI formats of different sizes, and/or DCI sizes of DCI in one format are caused to be different when the DCI is scrambled by using different RNTIs, in this case, when the UE detects DCI in the search space, the UE needs to perform blind detection at most in each PDCCH candidate resource location in the search space in a blind detection manner, and needs to perform blind detection in each PDCCH candidate resource location at most based on DCI of each size, to attempt to receive DCI transmitted in the search space. The UE may receive DCI in the search space, or may receive no DCI in the search space. When there is an overlapping part between the first common search space and the first specific search space, the quantity of times of blindly detecting a PDCCH by the UE may be reduced by using the method shown in FIG. 1. For example, in each PDCCH candidate resource location in the overlapping part, if DCI sizes of the first common search space and the first specific search space are different, the UE needs to perform detection for twice the quantity of times in total. However, if the DCI sizes of the first common search space and the first specific search space are the same, the UE only needs to perform detection for the quantity of times.

Figure 2:
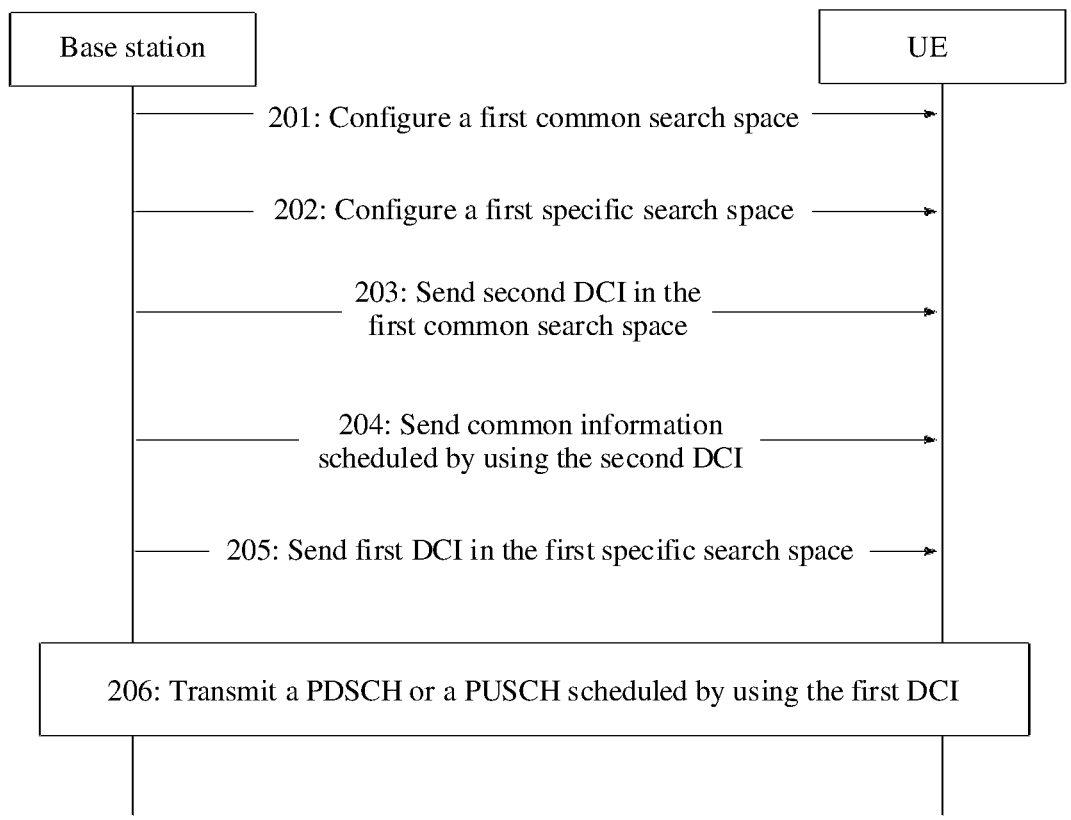

For example, FIG. 2 is a schematic flowchart of transmitting first DCI and second DCI between a base station and UE.

Operation 201: The base station sends configuration information of a first common search space to the UE. Correspondingly, the UE receives the configuration information of the first common search space.

A message carrying the configuration information of the first common search space may further carry configuration information of another common search space (for example, a second common search space). This is not limited in this embodiment of this application.

Operation 202: The base station sends configuration information of a first specific search space to the UE. Correspondingly, the UE receives the configuration information of the first specific search space.

A message carrying the configuration information of the first specific search space may further carry configuration information of another specific search space (for example, a second specific search space). This is not limited in this embodiment of this application.

Optionally, the configuration information of the first common search space in operation 201 and the configuration information of the first specific search space in operation 202 may be carried in one message, or may be carried in different messages. This is not limited in this embodiment of this application.

Optionally, operation 203: The base station sends second DCI to the UE in the first common search space, where the second DCI is used to schedule common information. Correspondingly, the UE detects the second DCI from the base station in the first common search space.

Optionally, operation 204: The base station sends, to the UE, the common information scheduled by using the second DCI. Correspondingly, the UE receives the common information sent by the base station.

For example, in the first common search space, the base station sends one piece of second DCI to the UE. In addition, the base station sends, to the UE, a PDSCH scheduled by using the second DCI, where the PDSCH carries a system message. Correspondingly, the UE detects the second DCI from the base station in the first common search space. The UE may detect the second DCI, or may not detect the second DCI. If the UE detects the second DCI, the UE may receive the PDSCH by using a transmission parameter indicated by the second DCI, to obtain the system message carried on the PDSCH.

For example, in the first common search space, the base station sends two pieces of second DCI to the UE. In addition, the base station sends, to the UE, a PDSCH scheduled by using a first piece of second DCI, where the PDSCH carries a system message; and sends, to the UE, a PDSCH scheduled by using a second piece of second DCI, where the PDSCH carries a paging message. Correspondingly, the UE detects the second DCI from the base station in the first common search space. The UE may detect one piece of second DCI, may detect two pieces of second DCI, or may not detect the second DCI. If the UE detects the first piece of second DCI, the UE may receive the PDSCH by using a transmission parameter indicated by the second DCI, to obtain the system message carried on the PDSCH. If the UE detects the second piece of second DCI, the UE may receive the PDSCH by using a transmission parameter indicated by the second DCI, to obtain the paging message carried on the PDSCH.

Optionally, operation 205: The base station sends first DCI to the UE in the first specific search space.

Optionally, operation 206: The base station and the UE transmit a PDSCH or a PUSCH scheduled by using the first DCI.

For example, in the first specific search space, the base station sends one piece of first DCI to the UE. In addition, the base station sends, to the UE, a PDSCH scheduled by using the first DCI, where the PDSCH carries specific information of the UE. Correspondingly, the UE detects the first DCI from the base station in the first specific search space. The UE may detect the first DCI, or may not detect the first DCI. If the UE detects the first DCI, the UE may receive the PDSCH by using a transmission parameter indicated by the first DCI, to obtain the specific information of the UE carried on the PDSCH.

For example, in the first specific search space, the base station sends two pieces of first DCI to the UE, where a first piece of first DCI is used to schedule a PDSCH, and a second piece of first DCI is used to schedule a PUSCH. In addition, the base station sends, to the UE, the PDSCH scheduled by using the first piece of first DCI, where the PDSCH carries specific information of the UE. Correspondingly, the UE detects the first DCI from the base station in the first specific search space. The UE may detect one piece of first DCI, may detect two pieces of first DCI, or may not detect the first DCI. If the UE detects the first piece of first DCI, the UE may receive the PDSCH by using a transmission parameter indicated by the first DCI, to obtain the specific information of the UE carried on the PDSCH. If the UE detects the second piece of first DCI, the UE may send the PUSCH to the base station by using a transmission parameter indicated by the first DCI, where the PUSCH carries the specific information of the UE.

Optionally, the base station may alternatively send the first DCI to the UE in the first common search space. Operations are similar to 205 and 206, and the first specific search space is replaced with the first common search space. In this case, in the first common search space, the UE attempts to descramble the DCI by using a possible RNTI. If the descrambling is correct, the UE may obtain an RNTI used to scramble the DCI, and therefore may determine whether the DCI is common DCI or UE-specific DCI.

An execution sequence of the foregoing operations is not limited in this embodiment of this application. For example, operations 201 and 202 may be performed in a same time unit. For example, operations 203 to 206 may be performed in a same time unit. Alternatively, operations 203 and 204 are performed in one time unit, and operations 205 and 206 are performed in another time unit.

The method shown in FIG. 1 may be any one of the following cases 1 to 4.

Case 1: The first DCI can only be used to schedule a PDSCH.

Case 2: The first DCI can only be used to schedule a PUSCH.

Case 3: The first DCI is used to schedule a PDSCH or a PUSCH. The first DCI may be used to schedule a PDSCH, and may be used to schedule a PUSCH. However, one piece of first DCI cannot be used to schedule both a PDSCH and a PUSCH.

In this case, the first DCI may be further used to indicate whether the first DCI is used to schedule a PDSCH or used to schedule a PUSCH. According to the method, types of sizes of first DCI that needs to be detected by the UE are further reduced, that is, sizes of DCI in two formats of DCI used to schedule a PDSCH and DCI used to schedule a PUSCH are the same, so that a quantity of times of detecting DCI by the UE may be reduced.

For example, the first DCI may include an identifier field for DCI formats, which is used to indicate whether the first DCI is used to schedule a PDSCH or a PUSCH. For example, the first DCI includes a 1-bit indicator field. When a value of the indicator field is a first value, the first DCI is used to schedule a PUSCH. When the indicator field is a second value, the first DCI is used to schedule a PDSCH. The first value and the second value may be respectively 1 and 0, or may be respectively 0 and 1. This is not limited in this embodiment of this application. After receiving one piece of first DCI, the UE determines, based on the value of the 1-bit indicator field, whether the first DCI is used to schedule a PDSCH or a PUSCH, and therefore may interpret the first DCI based on a corresponding DCI format.

For another example, when the first DCI is scrambled by using a first RNTI, the first DCI is used to schedule a PUSCH. When the first DCI is scrambled by using a second RNTI, the first DCI is used to schedule a PDSCH. When the UE receives the first DCI, if the UE successfully descrambles the first DCI by using the first RNTI, the UE considers that the first DCI is used to schedule a PUSCH, and therefore may interpret the first DCI based on a DCI format for the PUSCH and send the PUSCH to the base station by using a transmission parameter indicated by the first DCI. If the UE successfully descrambles the first DCI by using the second RNTI, the UE considers that the first DCI is used to schedule a PDSCH, and therefore may interpret the first DCI based on a DCI format for the PDSCH and receive the PDSCH from the base station by using information indicated by the first DCI.

In this embodiment of this application, types of information fields included in a DCI format used to schedule a PDSCH and types of information fields included a DCI format used to schedule a PUSCH may be all the same, or may be all different, or may be partially the same and partially different. This is not limited in this embodiment of this application. If the two DCI formats include a same type of information field, for example, each includes a frequency domain resource allocation field, a length (for example, a quantity of bits) of a frequency domain resource allocation field in DCI used to schedule a PDSCH and a length of a frequency domain resource allocation field in DCI used to schedule a PUSCH may be the same or different. This is not limited in this embodiment of this application.

Case 4: The first DCI is used to schedule a PDSCH and/or a PUSCH. The first DCI may be used to schedule a PDSCH, and may be used to schedule a PUSCH. One piece of first DCI may be used to schedule only a PDSCH, used to schedule only a PUSCH, or used to schedule both a PDSCH and a PUSCH.

In this case, the first DCI may be further used to indicate whether the first DCI is used to schedule a PDSCH, or used to schedule a PUSCH, or used to schedule a PDSCH and a PUSCH. According to the method, types of sizes of first DCI that needs to be detected by the UE are further reduced, that is, sizes of DCI in three formats of DCI used to schedule a PDSCH, DCI used to schedule a PUSCH, and DCI used for a PDSCH and a PUSCH are the same, so that a quantity of times of detecting DCI by the UE may be reduced.

When the first DCI is used to schedule a PUSCH, the first DCI includes a transmission parameter of the PUSCH, and does not include a transmission parameter of a PDSCH. When the first DCI is used to schedule a PDSCH, the first DCI includes a transmission parameter of the PDSCH, and does not include a transmission parameter of a PUSCH. When the first DCI is used to schedule both a PDSCH and a PUSCH, the first DCI includes transmission parameters of both the PDSCH and the PUSCH.

For example, the first DCI may include an identifier field for DCI formats, which is used to indicate whether the first DCI is used to schedule a PDSCH, a PUSCH, or a PDSCH and a PUSCH. For example, the first DCI includes a 2-bit indicator field. When a value of the indicator field is a first value, the first DCI is used to schedule a PUSCH. When the indicator field is a second value, the first DCI is used to schedule a PDSCH. When the indicator field is a third value, the first DCI is used to schedule a PDSCH and a PUSCH. For example, Table 2a to Table 2c provide an example correspondence between a value of the 2-bit indicator field in the first DCI and information scheduled by using the first DCI, and other possible correspondences are not enumerated one by one.

TABLE 2a

| Value of the 2-Bit Indicator Field in the First DCI | Content Scheduled by Using the First DCI |
| --- | --- |
| 00 | PDSCH |
| 01 | PUSCH |
| 10 | PDSCH and PUSCH |
| 11 | Reserved |

TABLE 2b

| Value of the 2-Bit Indicator Field in the First DCI | Content Scheduled by Using the First DCI |
| --- | --- |
| 00 | PUSCH |
| 01 | PDSCH |
| 10 | Reserved |
| 11 | PDSCH and PUSCH |

TABLE 2c

| Value of the 2-Bit Indicator Field in the First DCI | Content Scheduled by Using the First DCI |
| --- | --- |
| 00 | PDSCH and PUSCH |
| 01 | PDSCH |
| 10 | PUSCH |
| 11 | Reserved |

For another example, when the first DCI is scrambled by using a first RNTI, the first DCI is used to schedule a PUSCH. When the first DCI is scrambled by using a second RNTI, the first DCI is used to schedule a PDSCH. When the first DCI is scrambled by using a third RNTI, the first DCI is used to schedule a PDSCH and a PUSCH. When the UE receives the first DCI, if the UE successfully descrambles the first DCI by using the first RNTI, the UE considers that the first DCI is used to schedule a PUSCH, and therefore may interpret the first DCI based on a DCI format for the PUSCH and send the PUSCH to the base station by using a transmission parameter indicated by the first DCI. If the UE successfully descrambles the first DCI by using the second RNTI, the UE considers that the first DCI is used to schedule a PDSCH, and therefore may interpret the first DCI based on a DCI format for the PDSCH and receive the PDSCH from the base station by using a transmission parameter indicated by the first DCI. If the UE successfully descrambles the first DCI by using the third RNTI, the UE considers that the first DCI is used to schedule a PDSCH and a PUSCH, and therefore may interpret the first DCI based on a corresponding DCI format, send the PUSCH to the base station by using a transmission parameter that is of the PUSCH and that is indicated by the first DCI, and receive the PDSCH from the base station by using a transmission parameter that is of the PDSCH and that is indicated by the first DCI.

In a possible implementation, the first search space is a first specific search space of the UE. The first specific search space of the UE is included in a plurality of specific search spaces of the UE, for example, two, three, four, or more specific search spaces. Any one of the plurality of specific search spaces may correspond to N1 DCI formats. N1 is a positive integer greater than or equal to 1, and N1 values corresponding to any two different specific search spaces may be the same or different. If the N1 values corresponding to the two different specific search spaces are the same, specific formats of DCI corresponding to the two different specific search spaces may be the same or different. This is not limited in this embodiment of this application. The plurality of specific search spaces correspond to N2 DCI formats in total. DCI sizes of DCI in the N2 DCI formats are the same when the DCI is transmitted in a corresponding specific search space. N1 is an integer greater than or equal to 1, and N2 is an integer greater than or equal to N1.

In this embodiment of this application, for any specific search space, if the specific search space corresponds to N1 DCI formats, N1 is greater than 1, and DCI sizes corresponding to the N1 DCI formats are the same, for the N1 DCI formats, DCI in different formats may be distinguished by using an indicator field in the DCI and/or an RNTI used to scramble the DCI. For example, the specific search space corresponds to a DCI format A and a DCI format B, and DCI A and DCI B may be distinguished in any one of the following manners:

Manner A: DCI A and DCI B include an identifier field for DCI formats, which is used to indicate whether a format of the DCI is DCI A or DCI B. For example, the UE receives one piece of DCI, and the DCI includes a 1-bit indicator field. When a value of the indicator field is a first value, a format of the DCI is DCI A. When the indicator field is a second value, the format of the DCI is DCI B. The first value and the second value may be respectively 1 and 0, or may be respectively 0 and 1. This is not limited in this embodiment of this application.

Manner B: DCI A and DCI B are scrambled by using an RNTI, and the RNTI is used to indicate whether a format of the DCI is DCI A or DCI B. For example, the UE receives one piece of DCI, and if the DCI is successfully descrambled by using an RNTI A, it is considered that a format of the DCI is DCI A. If the DCI is successfully descrambled by using an RNTI B, it is considered that the format of the DCI is DCI B.

Manner C: DCI A and DCI B include an identifier field for DCI formats, DCI A and DCI B are scrambled by using an RNTI, and the identifier field and the RNTI together indicate whether a format of the DCI is DCI A or DCI B. For example, the UE receives one piece of DCI, and the DCI includes a 1-bit indicator field. If the DCI is successfully descrambled by using an RNTI A, and a value of the indicator field is a first value, it is considered that a format of the DCI is DCI A. If the DCI is successfully descrambled by using an RNTI B, and the value of the indicator field is a second value, it is considered that the format of the DCI is DCI B.

Optionally, the method may be used in combination with the method shown in FIG. 1. In this case, a size of DCI transmitted in the plurality of specific search spaces is the same as a size of second DCI. That is, the plurality of specific search spaces and a first common search space are configured to correspond to a same DCI size.

Optionally, the method may alternatively be used independently of the method shown in FIG. 1. When the method is used independently of the method shown in FIG. 1, for a description of the first specific search space and a description of first DCI transmitted in the first specific search space, refer to the foregoing description. When the method is used independently of the method shown in FIG. 1, a size of DCI transmitted in the plurality of specific search spaces may be aligned with the size of the second DCI in the method shown in FIG. 1, or may be aligned with another size. The another size may be a predefined value, or may be a DCI size corresponding to one of the N2 DCI formats. For example, the DCI size is a smallest DCI size in DCI sizes corresponding to the N2 DCI formats, or a largest DCI size in DCI sizes corresponding to the N2 DCI formats.

Optionally, the plurality of specific search spaces may be some specific search spaces configured for the UE, or may be all specific search spaces configured for the UE. This is not limited in this embodiment of this application. For example, the plurality of specific search spaces are all specific search spaces configured for the UE in one BWP of the UE.

For example, the UE has three specific search spaces, which are respectively a specific search space A, a specific search space B, and a specific search space C. A DCI format corresponding to each search space is shown in Table 3. For example, DCI transmitted in the specific search space A may be considered as first DCI, a first format is a format used when the first DCI schedules a PDSCH, a second format is a format used when the first DCI schedules a PUSCH, and the specific search space A may be considered as a first specific search space. The three specific search spaces in Table 3 correspond to four DCI formats in total: the first format, the second format, a third format, and a fourth format. When a plurality of pieces of DCI corresponding to the four formats are transmitted in a corresponding specific search space, sizes of the plurality of pieces of DCI are aligned, that is, the sizes of the plurality of pieces of DCI are the same.

TABLE 3

| | Corresponding DCI Format | Types of Corresponding DCI Formats |
|---|---|---|
| Specific search space A | First format and second format | 2 |
| Specific search space B | Second format and third format | 2 |
| Specific search space C | First format, second format, third format, and fourth format | 4 |

In the method, sizes of DCI transmitted in the plurality of specific search spaces of the UE are the same, that is, the plurality of specific search spaces are configured to correspond to one DCI size. When there is an overlapping part between the plurality of specific search spaces of the UE, a quantity of times of blindly detecting a PDCCH by the UE may be reduced.

In this embodiment of this application, for example, when sending DCI to the UE, the base station may perform at least one of the following operations 1 to 6 on the DCI. Correspondingly, when receiving the DCI, the UE may perform a corresponding reverse operation, for example, de-padding, adding an information bit that is cut off, descrambling, channel decoding, and/or demodulation.

Optionally, operation 1: Obtain the DCI based on a format corresponding to the DCI. Information bits in the DCI may be referred to as an original bit stream of the DCI.

Optionally, operation 2: Truncate or pad an input bit stream to obtain a truncated or padded bit stream. The input bit stream may be the original bit stream.

In this embodiment of this application, a type and a quantity of truncated information fields are not limited. For example, the truncated information field may be one or more of the following information fields: a frequency domain resource allocation field, a time domain resource allocation field, an MCS, and another possible information field.

Optionally, operation 3: Add a cyclic redundancy check (CRC) check bit to the input bit stream, to obtain a CRC bit stream. The CRC check bit may be used by the UE to perform error detection. The input bit stream in operation 3 may be the original bit stream, or may be the truncated or padded bit stream.

Optionally, operation 4: Perform channel coding on the input bit stream, to obtain a channel coded bit stream. A channel coding method may be a low-density parity-check code (LDPC), a polar code, or a turbo code. A code rate of the coding may be a real number greater than 0, for example, ½, ⅓, or ⅔. Optionally, the channel coding operation may further include a rate matching operation. The rate matching operation may be understood as: Based on a quantity of resources corresponding to data transmission and a modulation order of data transmission, the UE performs the rate matching operation on an output bit stream obtained after channel coding, to obtain an output bit stream that matches the data transmission resource and the modulation order. The input bit stream in operation 4 may be the original bit stream, the truncated or padded bit stream, or the CRC bit stream.

Optionally, operation 5: Scramble the input bit stream based on a scrambling sequence, to obtain a scrambled bit stream. Inter-cell interference may be reduced by performing the scrambling operation. The input bit stream in operation 5 may be the original bit stream, the truncated or padded bit stream, the CRC bit stream, or the channel coded bit stream.

Optionally, operation 6: Modulate the input bit stream, to obtain a modulation symbol. A modulation method may be QAM modulation, and a modulation order may be 16 QAM, 64 QAM, 128 QAM, or the like. This is not limited in this embodiment of this application. The input bit stream in operation 6 may be the original bit stream, the truncated or padded bit stream, the CRC bit stream, the channel coded bit stream, or the scrambled bit stream.

In this embodiment of this application, that sizes of one piece of DCI A (for example, first DCI) and another piece of DCI B (for example, second DCI) are the same or aligned includes any one of the following cases. For example, DCI A is first DCI, and DCI B is second DCI. Alternatively, DCI A is second DCI, and DCI B is first DCI. Alternatively, DCI A is DCI in a first specific search space, and DCI B is DCI in a second specific search space. This is not limited in this embodiment of this application.

(1) DCI A is obtained based on a DCI format corresponding to DCI A, DCI B is obtained based on a DCI format corresponding to DCI B, and a quantity of bits included in DCI A is the same as a quantity of bits included in DCI B. That is, a quantity of bits of an original bit stream of DCI A is the same as a quantity of bits of an original bit stream of DCI B. In this embodiment of this application, an original bit stream of DCI may also be referred to as an information bit stream of the DCI.

(2) DCI A is obtained based on a DCI format corresponding to DCI A, DCI A is padded or truncated, DCI B is obtained based on a DCI format corresponding to DCI B, and a quantity of bits included in padded or truncated DCI A is the same as a quantity of bits included in DCI B. That is, a quantity of bits of a truncated or padded bit stream of DCI A is the same as a quantity of bits of an original bit stream of DCI B.

In a possible implementation, if DCI A and DCI B may be aligned by truncating or padding a bit stream, and if it is determined that an original bit stream of DCI A and the original bit stream of DCI B have a same quantity of bits, bit stream truncating or padding does not need to be performed on DCI A or DCI B.

(3) DCI A is obtained based on a DCI format corresponding to DCI A, DCI B is obtained based on a DCI format corresponding to DCI B, DCI B is padded or truncated, and a quantity of bits included in DCI A is the same as a quantity of bits included in padded or truncated DCI B. That is, a quantity of bits of an original bit stream of DCI A is the same as a quantity of bits of a truncated or padded bit stream of DCI B.

(4) DCI A is obtained based on a DCI format corresponding to DCI A, and DCI B is obtained based on a DCI format corresponding to DCI B. A first operation is performed on DCI A, to obtain a first bit stream. A first operation is performed on DCI B, to obtain a second bit stream. The first bit stream and the second bit stream have a same quantity of bits. The first operation may include: adding a CRC; adding a CRC and channel coding; adding a CRC and scrambling; or adding a CRC, channel coding, and scrambling. Optionally, for DCI A, DCI B, or DCI A and DCI B, the first operation may further include truncating or padding.

(5) DCI A is obtained based on a DCI format corresponding to DCI A, and DCI B is obtained based on a DCI format corresponding to DCI B. A second operation is performed on DCI A, to obtain a first group of modulation symbols. A second operation is performed on DCI B, to obtain a second group of modulation symbols. The first group of modulation symbols and the second group of modulation symbols have a same quantity of symbols. The second operation may include: modulation; adding a CRC and modulation; channel coding and modulation; scrambling and modulation; adding a CRC, channel coding, and modulation; adding a CRC, scrambling, and modulation; or adding a CRC, channel coding, scrambling, and modulation. Optionally, for DCI A, DCI B, or DCI A and DCI B, the second operation may further include truncating or padding.

In this embodiment of this application, as described above, to enable sizes of different DCI sent by the base station to the UE to be the same, the base station may pad or truncate one or more pieces of DCI, so that the sizes of the different DCI are aligned to be the same when the different DCI is transmitted. The different DCI may be first DCI and second DCI, or may be DCI transmitted in different specific search spaces of the UE. To simplify description, the first DCI and the second DCI are used as an example for description herein.

For example, the base station may pad or truncate an original bit stream of the first DCI, so that a size of the first DCI is aligned to a size of the second DCI. Similarly, optionally, the base station may pad or truncate an original bit stream of the second DCI, so that the size of the second DCI is aligned to the size of the first DCI. To simplify description, alignment of the first DCI to the second DCI is used as an example for description herein.

In a possible implementation, the first DCI includes a padding bit. The padding bit includes at least one bit. A value of the at least one bit is preconfigured, and is known to both the base station and the UE. For example, a value of each bit of the at least one bit is 0. For another example, the value of each bit of the at least one bit is 1. Optionally, a location of the padding bit in the first DCI or a padding rule may be predefined. For example, the padding bit may be added before most significant bit information of the first DCI or after least significant bit information of the first DCI. The rule is known to the base station and the UE in advance.

For example, after the base station determines the first DCI based on a DCI format corresponding to the first DCI, if the size of the first DCI is less than the size of the second DCI, the base station pads the first DCI. It is assumed that a value of a padded bit is zero. It is considered that the base station performs a zero padding operation on the first DCI, and a size of the first DCI obtained after zero padding is equal to the size of the second DCI. The base station sends the first DCI obtained after zero padding to the UE.

The UE may obtain, based on the DCI format corresponding to the first DCI, the size of the first DCI before zero padding, and may obtain the size of the second DCI based on a format corresponding to the second DCI, so that the UE may determine a quantity of zero-padding bits in the first DCI. After receiving the first DCI from the base station, the UE removes the zero-padding bit from the first DCI or ignores the zero-padding bit in the first DCI, so that the UE may determine content of the first DCI based on a non-zero-padding bit in the first DCI. For example, when the first DCI is used to schedule a PDSCH, the UE may receive the PDSCH from the base station based on the determined content of the first DCI. For another example, the first DCI is used to schedule a PUSCH, and the UE may send the PUSCH to the base station based on the determined content of the first DCI.

In a possible implementation, the first DCI includes a truncated information field. The truncated information field includes one or more information fields, and one or more bits may be cut off from each information field. Quantities of bits cut off from different types of information fields may be the same or different. An information field (or information fields) that is in the first DCI and that is to be truncated is predefined, and a rule for performing a truncating operation in the information field is predetermined. That is, the base station and the UE know in advance the information field (or information fields) that is in the first DCI and that is to be truncated, and a bit (or bits) that is in the information field and that is to be cut off. In this embodiment of this application, cutting off a bit in an information field in DCI or performing a truncating operation on DCI may be described as: puncturing the DCI or the information field in the DCI.

For example, after the base station determines the first DCI based on a DCI format corresponding to the first DCI, if the size of the first DCI is greater than the size of the second DCI, the base station truncates the first DCI. For example, the first DCI includes a frequency domain resource allocation field, and the base station cuts off most significant information bits in the field, so that the frequency domain resource allocation field in the first DCI does not include the most significant information bits, but includes only least significant information bits other than the most significant information bits. For another example, the first DCI includes information fields of two transport blocks, and the base station cuts off an information field of one transport block, so that the first DCI includes only an information field of the other transport block. A size of the truncated first DCI is equal to the size of the second DCI. After the UE receives the truncated first DCI, if the UE needs to interpret a truncated information field, the UE may pad a most significant bit of the information field with zero, and interpret the information field obtained after zero padding. For example, two most significant information bits of the frequency domain resource allocation field in the first DCI are cut off. In this case, the UE supplements most significant bits of the frequency domain resource allocation field in the received first DCI with two bits, where values of the two bits are 00; and the UE interprets the frequency domain resource allocation field obtained after zero padding.

Optionally, for a truncated information field, for example, for an information field of one transport block cut off from information fields of two transport blocks, the base station may reuse another information field to indicate the truncated information field. For example, as predefined, after an information field of a second transport block is truncated, an information field of a first transport block may be reused to indicate the first transport block and the second transport block. In this case, the UE may determine, based on the information field of the first transport block included in the first DCI, transmission information corresponding to the second transport block. For example, the UE may determine that the transmission information of the second transport block is the same as transmission information of the first transport block, or the UE may determine, based on offset information between the transmission information of the first transport block and the transmission information of the second transport block, the transmission information corresponding to the second transport block. The offset information may be predefined, or may be notified by the base station to the UE by using signaling. For example, if the information field of the first transport block indicates an MCS 1 and an RV 1, after receiving the first DCI, the UE determines that MCSs of the first transport block and the second transport block are both the MCS 1, and determines that RVs of the first transport block and the second transport block are both the RV 1.

In the method provided in this embodiment of this application, the first DCI may be used to indicate an active BWP of the UE, and the active BWP is used by the UE and the base station to transmit a physical data channel. The first DCI may further include a frequency domain resource allocation field, which is used to indicate a frequency domain resource allocated to the physical data channel in the active BWP. The physical data channel carries specific information of the UE.

In a possible implementation, a size of the frequency domain resource allocation field in the first DCI may be determined based on bandwidth of an initial BWP or bandwidth of a control resource set (CORESET) 0. Optionally, in this embodiment of this application, a REDCAP terminal and a high-capability terminal may share an initial BWP and a CORESET 0, or an independent initial BWP and an independent CORESET 0 may be separately configured for the two terminals. In the frequency domain resource allocation method, if the method is implemented by the REDCAP terminal, the initial BWP and the CORESET 0 in the frequency domain resource allocation method may be an initial BWP and a CORESET 0 that are configured for the REDCAP terminal, or may be an initial BWP and a CORESET 0 that are configured for the high-capability terminal.

In this embodiment of this application, the base station may send an SSB to the UE in the initial BWP. The SSB may carry a master information block (MIB). The MIB may be used to indicate a resource location of the initial BWP. After finding the SSB, the UE may obtain a specific resource location of the initial BWP based on a configuration of the MIB in the SSB. In the initial BWP, the base station may further send one or more of the following common information to the UE by using a PDSCH: a system information block (SIB) 1, on-demand system information (OSI), and a paging message. In this embodiment of this application, the SSB is cell-level common information, and the SSB may include a primary synchronization signal (PSS), a secondary synchronization signal (SSS), and a physical broadcast channel. The PBCH carries the MIB. An SSB used to indicate configuration information of the initial BWP may also be referred to as a cell defined SSB.

In this embodiment of this application, configuration information of the CORESET 0 may be preconfigured, or indicated by the base station to the UE by using signaling. The signaling may be a MIB or a PDCCH common configuration message PDCCH-ConfigCommon. For example, the MIB may indicate one or more of the following parameters of the CORESET 0: a frequency domain resource location in a carrier, a quantity of symbols occupied in time domain, and a multiplexing manner between the CORESET 0 and the SSB. As described above, the CORESET 0 may be associated with a search space, and the UE may detect, based on a configuration of the search space, corresponding DCI in a resource corresponding to the CORESET 0. The search space associated with the CORESET 0 is a common search space. DCI scrambled by using a common RNTI (for example, an SI-RNTI) may be transmitted in the common search space. Optionally, DCI scrambled by using a UE-specific RNTI may also be transmitted in the common search space.

To simplify description, description is provided below by using an example in which the size of the frequency domain resource allocation field in the first DCI is determined based on the bandwidth of the initial BWP of the UE. When the size of the frequency domain resource allocation field is determined based on the bandwidth of the CORESET 0, the initial BWP in the following method is replaced with the CORESET 0, and the bandwidth of the initial BWP is replaced with the bandwidth of the CORESET 0.

The frequency domain resource allocation field in the first DCI may indicate, in the following manners, a frequency domain resource allocated to a PDSCH or a PUSCH of the UE in the active BWP of the UE. If a frequency domain resource of the PDSCH of the UE is indicated, the UE may receive the PDSCH from the base station on the frequency domain resource. If a frequency domain resource of the PUSCH of the UE is indicated, the UE may send the PUSCH to the base station on the frequency domain resource.

First Manner (A Manner 0)

The frequency domain resource allocation field in the first DCI includes $N^{RBG}$ bits. The $N^{RBG}$ bits one-to-one correspond to $N^{RBG}$ RBGs in the active BWP. For one bit in the $N^{RBG}$ bits, when a value of the bit is a first value (for example, 1), a resource allocated to the UE includes an RBG corresponding to the one bit. When the value of the bit is a second value (for example, 0) or is not the first value, the resource allocated to the UE does not include the RBG corresponding to the one bit. $N^{RBG}$ is less than or equal to a quantity of RBGs included in the initial BWP.

In this embodiment of this application, one RBG includes a positive integer quantity of RBs, and the quantity of included RBs may be referred to as a size of the RBG. One RB includes a positive integer quantity of subcarriers. For example, each RB is predefined to include 6 or 12 subcarriers. A size of one RBG may be predefined. For example, one RBG is predefined to include 2, 4, 6, 8, or 16 RBs. Alternatively, a size of one RBG may be determined based on bandwidth of specific bandwidth (denoted by bandwidth X). For example, Table 4 shows a correspondence (a configuration 1 or a configuration 2) between bandwidth of the bandwidth X and a size of an RBG, where the bandwidth X is bandwidth of a BWP. When both the configuration 1 and the configuration 2 are supported in a system, the base station may indicate, by using signaling, the UE to use one of the configuration 1 and the configuration 2.

TABLE 4

| Bandwidth of the Bandwidth X (Quantity of RBs Included in the Bandwidth X) | RBG Size $N_{RBG}^{RB}$ (Configuration 1) | RBG Size $N_{RBG}^{RB}$ (Configuration 2) |
| --- | --- | --- |
| 1-36 | 2 | 4 |
| 37-72 | 4 | 8 |
| 73-144 | 8 | 16 |
| 145-275 | 16 | 16 |

TABLE 4-continued

For example, in the method in the manner 0, the quantity of RBGs included in the initial BWP is determined based on the bandwidth of the initial BWP and an RBG size $N_{INI\_RBG}^{RB}$ of the initial BWP. The bandwidth of the initial BWP is a quantity $N_{INI}^{RB}$ of RBs included in the initial BWP, and $N_{INI}^{RB}$ and $N_{INI\_RBG}^{RB}$ are positive integers. The RBG size of the initial BWP may be predefined, or may be determined based on the bandwidth of the initial BWP. For example, the RBG size $N_{INI\_RBG}^{RB}$ of the initial BWP may be obtained by replacing the bandwidth X in Table 4 with the initial BWP, and replacing $N_{RBG}^{RB}$ in Table 4 with $N_{INI\_RBG}^{RB}$.

The initial BWP includes a total of $N_{INI}^{RBG}$ RBGs. In an example 1, $N_{INI}^{RBG}$ is equal to $$\left\lceil \frac{N_{INI}^{RB}}{N_{INI\_RBG}^{RB}} \right\rceil.$$

When $N_{INI}^{RB}$ can be exactly divided by $N_{INI\_RBG}^{RB}$, each RBG has a same size, which is $N_{INI\_RBG}^{RB}$. In an example 2, regardless of whether $N_{INI}^{RB}$ can be exactly divided by $N_{INI\_RBG}^{RB}$, $N_{INI}^{RBG}$ is equal to $\lceil (N_{INI}^{RB}+(N_{INI}^{start} \bmod N_{INI\_RBG}^{RB}))/N_{INI\_RBG}^{RB}\rceil$, where $N_{INI}^{start}$ represents an RB index corresponding to a start RB of the initial BWP. In this case, a size of the first RBG included in the initial BWP is $N_{INI\_RBG}^{RB} - N_{INI}^{start} \bmod N_{INI\_RBG}^{RB}$. If $(N_{INI}^{start}+N_{INI}^{RB}) \bmod N_{INI\_RBG}^{RB} > 0$, a size of the last RBG in the initial BWP is $(N_{INI}^{start}+N_{INI}^{RB}) \bmod N_{INI\_RBG}^{RB}$; otherwise, the size of the last RBG is $N_{INI\_RBG}^{RB}$. Sizes of other RBGs included in the initial BWP are all $N_{INI\_RBG}^{RB}$. mod represents a modulo operation. In the resource allocation method in this embodiment of this application, unless otherwise specified, a same variable represents a same meaning, and a meaning of a variable already described is not described in detail below.

In a possible implementation, when bandwidth of the active BWP indicated by the first DCI is greater than or equal to the bandwidth of the initial BWP, in the method in the manner 0, $N^{RBG}$ is equal to the quantity $N_{INI}^{RBG}$ of RBGs included in the initial BWP. Optionally, a size of one RBG in the active BWP is predefined, or is determined based on the bandwidth of the active BWP. For example, the bandwidth of the active BWP and the size of the RBG in the active BWP are shown in Table 4. Similar to the foregoing method for determining the RBG size and the RBG quantity of the initial BWP based on Table 4, the RBG size of the active BWP may be obtained.

Optionally, when the bandwidth of the active BWP indicated by the first DCI is equal to the bandwidth of the initial BWP, the first DCI can indicate at most $N^{RBG}$ RBGs in the active BWP, and indicate which RBGs in the $N^{RBG}$ RBGs are allocated to the UE. The $N^{RBG}$ RBGs are all RBGs in the active BWP.

Optionally, when the bandwidth of the active BWP indicated by the first DCI is greater than the bandwidth of the initial BWP, the first DCI can indicate at most $N^{RBG}$ RBGs in the active BWP, and indicate which RBGs in the $N^{RBG}$ RBGs are allocated to the UE. The $N^{RBG}$ RBGs are some RBGs in the active BWP.

Optionally, when the bandwidth of the active BWP indicated by the first DCI is greater than the bandwidth of the initial BWP, some or all bits in another information field in the first DCI may be reused, to indicate whether more RBGs in the active BWP are allocated to the UE. An information field that may be reused may be, for example, one or more of the following information fields: a DAI field, a PUCCH resource indicator field, an MCS field, a time domain resource allocation field, and the frequency domain resource allocation field. For example, a quantity of reused bits is $N_{share}^{RBG}$. In this case, the $N^{RBG}$ bits in the frequency domain resource allocation field and the $N_{share}^{RBG}$ bits form a total of $N^{RBG}+N_{share}^{RBG}$ bits, and the $N^{RBG}+N_{share}^{RBG}$ bits one-to-one correspond to $N^{RBG}+N_{share}^{RBG}$ RBGs in the active BWP. For one bit in the $N^{RBG}+N_{share}^{RBG}$ bits, when a value of the bit is a first value (for example, 1), a resource allocated to the UE includes an RBG corresponding to the one bit. When the value of the bit is a second value (for example, 0) or is not the first value, the resource allocated to the UE does not include the RBG corresponding to the one bit. According to the method, the base station may indicate which RBGs in some or all RBGs in the active BWP are allocated to the UE.

In a possible implementation, the bandwidth of the active BWP indicated by the first DCI is less than the bandwidth of the initial BWP, and in the method in the manner 0, $N^{RBG}$ is less than or equal to the quantity $N_{INI}^{RBG}$ of RBGs included in the initial BWP. In this case, the active BWP includes $N^{RBG}$ RBGs. The RBG size of the active BWP is determined based on a quantity $N_{ACT}^{RB}$ of RBs included in the active BWP and $N^{RBG}$. $N_{ACT}^{RB}$ is a positive integer. For example, when $N_{ACT}^{RB}$ can be exactly divided by $N^{RBG}$, each RBG in the active BWP has a same size, which is $$\left\lceil \frac{N_{ACT}^{RB}}{N^{RBG}} \right\rceil.$$

When $N_{ACT}^{RB}$ cannot be exactly divided by $N^{RBG}$, a size of the first RBG or the last RBG included in the active BWP is $\lfloor N_{ACT}^{RB}/N^{RBG} \rfloor + N^{RB} \bmod N^{RBG}$, and sizes of remaining RBGs are all $\lfloor N_{ACT}^{RB}/N^{RBG} \rfloor$. In the method, by changing the RBG size of the active BWP, the base station may indicate which RBGs in all RBGs in the active BWP are allocated to the UE.

In a possible implementation, the bandwidth of the active BWP indicated by the first DCI is greater than the bandwidth of the initial BWP, and in the method in the manner 0, $N^{RBG}$ is equal to the quantity $N_{INI}^{RBG}$ of RBGs included in the initial BWP. In this case, the active BWP includes $N^{RBG}$ RBGs. The RBG size of the active BWP is determined based on the bandwidth of the active BWP, that is, a quantity $N_{ACT}^{RB}$ of RBs included in the active BWP, and $N^{RBG}$. For example, when $N_{ACT}^{RB}$ can be exactly divided by $N^{RBG}$, the RBG size of the active BWP may be expressed as $N_{ACT}^{RB}/N^{RBG}$. When $N_{ACT}^{RB}$ cannot be exactly divided by $N^{RBG}$, a size of the first RBG or the last RBG included in the active BWP is $\lfloor N_{ACT}^{RB}/N^{RBG} \rfloor + N^{RB} \bmod N^{RBG}$, and sizes of remaining RBGs are all $\lfloor N_{ACT}^{RB}/N^{RBG} \rfloor$. In the method, the base station may indicate which RBGs in all RBGs in the active BWP are allocated to the UE.

Second Manner: A Manner 1

For example, the frequency domain resource allocation field in the first DCI includes $\lceil \log_2(N_{INI}^{RB} \times (N_{INI}^{RB}+1)/2) \rceil$ bits. $N_{INI}^{RB}$ represents a quantity of RBs included in the initial BWP.

In a possible implementation, bandwidth of the active BWP indicated by the first DCI is greater than the bandwidth of the initial BWP, and a value of the frequency domain resource allocation field to which $\lceil \log_2(N_{ACT}^{RB} \times (N_{ACT}^{RB}+1)/2) \rceil - \lceil \log_2(N_{INI}^{RB} \times (N_{INI}^{RB}+1)/2) \rceil$ bits are added is a resource indication value (RIV). The RIV is used to indicate a start RB allocated to a PDSCH or a PUSCH of the UE in the active BWP and a quantity of consecutively allocated RBs. $N_{ACT}^{RB}$ represents a quantity of RBs included the active BWP. Values of the added bits may be all 0, all 1, or other preconfigured values. Optionally, the base station sends the first DCI to the UE, where the frequency domain resource allocation field in the first DCI includes $\lceil \log_2(N_{INI}^{RB} \times (N_{INI}^{RB}+1)/2) \rceil$ bits. After receiving the first DCI, the UE may add $\lceil \log_2(N_{ACT}^{RB} \times (N_{ACT}^{RB}+1)/2) \rceil - \lceil \log_2(N_{INI}^{RB} \times (N_{INI}^{RB}+1)/2) \rceil$ bits to most significant bits or least significant bits of the frequency domain resource allocation field in the first DCI; use, as a RIV, values of $\lceil \log_2(N_{ACT}^{RB} \times (N_{ACT}^{RB}+1)/2) \rceil$ bits obtained after the bits are added; and determine, based on the RIV, a start RB allocated to a PDSCH or a PUSCH of the UE in the active BWP and a quantity of consecutively allocated RBs.

In a possible implementation, bandwidth of the active BWP indicated by the first DCI is less than the bandwidth of the initial BWP. Values of $\lfloor \log_2(N_{ACT}^{RB} \times (N_{ACT}^{RB}+1)/2) \rfloor$ bits in the frequency domain resource allocation field in the first DCI are a RIV, which is used to indicate a start RB allocated to a PDSCH or a PUSCH of the UE in the active BWP and a quantity of consecutively allocated RBs. $N_{ACT}^{RB}$ is a quantity of RBs included the active BWP. In this case, the frequency domain resource allocation field in the first DCI includes $\lceil \log_2(N_{INI}^{RB} \times (N_{INI}^{RB}+1)/2) \rceil - \lceil \log_2(N_{ACT}^{RB} \times (N_{ACT}^{RB}+1)/2) \rceil$ redundant bits. The redundant bits may be located at most significant bits of the frequency domain resource allocation field, and may be filled with 0 or 1. When determining an allocated resource based on the received frequency domain resource allocation field, the UE may not consider the reserved bits, for example, may cut off or discard the reserved bits.

In a possible implementation, bandwidth of the active BWP indicated by the first DCI is greater than or less than the bandwidth of the initial BWP. After receiving the DCI, the UE may determine, based on a scaling factor and a frequency resource indicated by a RIV, a resource allocated to a PDSCH or a PUSCH of the UE in the active BWP. The RIV is a value indicated by $\lceil \log_2(N_{INI}^{RB} \times (N_{INI}^{RB}+1)/2) \rceil$ bits in the frequency domain resource allocation field in the first DCI. The scaling factor may be expressed as $N_{ACT}^{RB}/N_{INI}^{RB}$. The UE may determine, based on the RIV, an allocated start RB location, where the start RB location is a start RB location allocated to the PDSCH or the PUSCH of the UE in the active BWP. The UE obtains, based on a product of a quantity of RBs that is indicated by the RIV and the scaling factor, a quantity of RBs allocated to the PDSCH or the PUSCH of the UE in the active BWP. When the product is not an integer, rounding up or rounding down may be performed on the product.

Third Manner the Manner 0 or the Manner 1

For example, the frequency domain resource allocation field in the first DCI includes $$\max\left(\left\lceil\log_2\left(N_{INI}^{RB}\times\frac{(N_{INI}^{RB}+1)}{2}\right)\right\rceil, N_{RBG}\right)+1 \text{ bits.}$$

A most significant bit or a least significant bit in the frequency domain resource allocation field is used to indicate whether a resource allocation manner is the manner 0 or the manner 1. When the resource allocation manner is the manner 0, $N_{RBG}$ bits in the resource allocation field are used to indicate, according to the manner 0, a resource allocated to a PDSCH or a PUSCH of the UE in the active BWP indicated by the first DCI. When the resource allocation manner is the manner 1, $\lfloor\log_2(N_{INI}^{RB}\times(N_{INI}^{RB}+1)/2)\rfloor$ bits in the resource allocation field are used to indicate, according to the manner 1, a resource allocated to a PDSCH or a PUSCH of the UE in the active BWP indicated by the first DCI.

Optionally, in the frequency domain resource allocation field in the first DCI, a quantity of bits used to indicate an allocated resource is predefined. For example, as predefined, the quantity of bits is determined based on minimum bandwidth, maximum bandwidth, or specific bandwidth of a CORESET 0 supported by a system. For example, as predefined, the quantity of bits used to indicate the allocated resource in the first DCI is determined based on the minimum bandwidth of the CORESET 0; and bandwidth of the CORESET 0 supported by the system is 5 MHz, 10 MHz, and 20 MHz. If the manner 1 is used to calculate the size of the frequency domain resource allocation field, sizes of the frequency domain resource allocation field that are corresponding to the three types of bandwidth are respectively 9 bits, 11 bits, and 13 bits, and the quantity of bits used to indicate the allocated resource in the first DCI may be always 9 bits. In this way, when the bandwidth of the CORESET 0 is actually 10 MHz or 20 MHz, it may be obtained, based on the bandwidth of the CORESET 0, that the size of the frequency domain resource allocation field in the first DCI is 11 bits or 13 bits. However, only 9 bits in the 11 bits or the 13 bits are used to indicate resource allocation. In this case, the resource allocation field in the first DCI may have 2 (11−9) redundant bits or 4 (13−9) redundant bits. Optionally, the redundant bits may be considered as reserved bits, and the 9 bits may be considered as bits in the frequency domain resource allocation field. The redundant 2 bits or 4 bits may implement more data transmission functions, for example, PUCCH resource indication, and for another example, hybrid automatic repeat request (HARQ) timing indication. For example, Table 5 below shows a length (a quantity of included bits) of an information field in the first DCI when the bandwidth of the CORESET 0 is 24 RBs, 48 RBs, and 96 RBs.

TABLE 5

| Bandwidth of the CORESET 0 | 24 RBs | 48 RBs | 96 RBs |
|---|---|---|---|
| Identifier for DCI formats | 1 | 1 | 1 |
| Frequency domain resource allocation field | 9 | 9 | 9 |
| Time domain resource allocation field | 4 | 4 | 4 |
| Mapping field from a VRB to a PRB | 1 | 1 | 1 |
| MCS field of a transport block 1 | 5 | 5 | 5 |
| NDI field of the transport block 1 | 1 | 1 | 1 |
| RV field of the transport block 1 | 2 | 2 | 2 |
| HPN field | 4 | 4 | 4 |
| DAI field | 2 | 2 | 2 |
| Transmit power control command field for a scheduled PUSCH | 2 | 2 | 2 |
| PUCCH resource indicator field | 3 | 3 | 3 |
| PDSCH-to-HARQ feedback timing indicator field | 3 | 3 | 3 |
| Reserved bit field | 0 | 2 (2 bits reserved in the frequency domain resource allocation field) | 4 (4 bits reserved in the frequency domain resource allocation field) |

In this manner, because the quantity of bits used to indicate the allocated resource is always 9 bits, when the quantity of bits does not match a quantity of bits required for resource allocation in the active BWP, a method for performing resource allocation in the active BWP by using the 9 bits is similar to any one of the foregoing three manners. The initial BWP is replaced with the CORESET 0, and the bandwidth of the CORESET 0 is 24 RBs.

In this embodiment of this application, when a terminal device is a REDCAP terminal, bandwidth of an initial BWP of the terminal device may be the same as or different from bandwidth of an initial BWP of a non-REDCAP terminal. An initial CORESET 0 of the terminal device may be the same as or different from an initial CORESET 0 of the non-REDCAP terminal.

According to the method, the size of the frequency domain resource allocation field in the first DCI may be aligned with a size of a frequency domain resource allocation field in the second DCI. In the method provided in this embodiment of this application, if the base station sends the second DCI to the UE, the second DCI may schedule a physical data channel carrying common information, for example, a PDSCH. The PDSCH is transmitted in the initial BWP or the CORESET 0. The frequency domain resource allocation field in the second DCI may indicate a frequency domain resource allocated to the PDSCH in the initial BWP or the CORESET 0. A resource allocation manner may be similar to the manner 0 or the manner 1. The size of the frequency domain resource allocation field is determined based on the bandwidth of the initial BWP or the CORESET 0, and the frequency domain resource allocation field indicates a resource allocated to the PDSCH in the initial BWP or the CORESET 0.

For example, resource allocation in the initial BWP is used as an example. For the second DCI, when a frequency domain resource is allocated to the physical data channel by using the manner 0, the frequency domain resource allocation field in the second DCI includes $N_{INI}^{RBG}$ bits. The $N_{INI}^{RBG}$ bits one-to-one correspond to $N_{INI}^{RBG}$ RBGs in the initial BWP. For one bit in the $N_{INI}^{RBG}$ bits, when a value of the bit is a first value (for example, 1), a resource allocated to the physical data channel includes an RBG corresponding to the one bit. When the value of the bit is a second value (for example, 0) or is not the first value, the resource allocated to the physical data channel does not include the RBG corresponding to the one bit. $N_{INI}^{RBG}$ is a quantity of RBGs included in the initial BWP. For example, resource allocation in the initial BWP is used as an example. For the second DCI, when a frequency domain resource is allocated to the physical data channel by using the manner 1, the frequency domain resource allocation field in the second DCI includes $\lfloor \log_2(N_{INI}^{RB} \times (N_{INI}^{RB}+1)/2) \rfloor$ bits. Values of the $\lfloor \log_2 (N_{INI}^{RB} \times (N_{INI}^{RB}+1)/2) \rfloor$ bits are a RIV, which is used to indicate a start RB allocated to the physical data channel in the initial BWP and a quantity of consecutively allocated RBs. $N_{INI}^{RB}$ represents a quantity of RBs included in the initial BWP.

For example, resource allocation in the initial BWP is used as an example. For the second DCI, when a frequency domain resource is allocated to the physical data channel by using the manner 0 or the manner 1, the frequency domain resource allocation field in the second DCI includes $$\max\left(\left\lceil \log_2\left(N_{INI}^{RB} \times \frac{(N_{INI}^{RB}+1)}{2}\right)\right\rceil, N_{INI}^{RBG}\right) + 1 \text{ bits.}$$

A most significant bit or a least significant bit in the frequency domain resource allocation field is used to indicate whether a resource allocation manner is the manner 0 or the manner 1. When the resource allocation manner is the manner 0, $N_{INI}^{RBG}$ bits in the resource allocation field are used to indicate, according to the manner 0, a resource allocated to the physical data channel in the initial BWP. When the resource allocation manner is the manner 1, $\lfloor \log_2(N_{INI}^{RB} \times (N_{INI}^{RB}+1)/2) \rfloor$ bits in the resource allocation field are used to indicate, according to the manner 1, a resource allocated to the physical data channel in the initial BWP. Therefore, in the method, the size of the frequency domain resource allocation field in the first DCI is determined based on the bandwidth of the initial BWP or the CORESET 0, so that the size of the frequency domain resource allocation field in the first DCI may be aligned with the size of the frequency domain resource allocation field in the second DCI.

In the foregoing embodiments provided in this application, the methods provided in the embodiments of this application are separately described from perspectives of a network device (for example, a base station), a terminal device (for example, UE), and interaction between a network device and a terminal device. To implement the functions in the methods provided in the embodiments of this application, the network device and the terminal may include a hardware structure and/or a software module, and implement the foregoing functions in a form of a hardware structure, a software module, or a hardware structure and a software module. Whether one of the foregoing functions is performed in the form of a hardware structure, a software module, or a hardware structure and a software module depends on a specific application and implementation constraints of the technical solutions.

Figure 3:
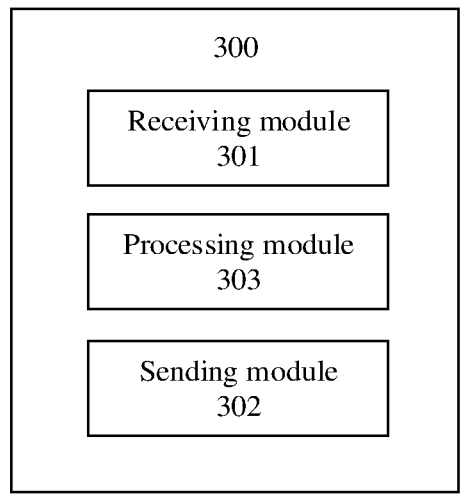
FIG. 3 and FIG. 4 are example diagrams of a structure of an apparatus according to an embodiment of this application.

FIG. 3 is an example diagram of a structure of an apparatus 300 according to an embodiment of this application.

In a possible implementation, the apparatus 300 is configured to implement a function of the terminal device in the foregoing method. The apparatus may be a terminal device, or may be another apparatus that can implement a function of the terminal device. The another apparatus can be installed in the terminal device, or be matched with the terminal device for use.

The apparatus 300 includes a receiving module 301, configured to receive a signal or information, for example, configured to receive one or more of the following signals from a network device: first DCI, second DCI, and a PDSCH.

The apparatus 300 includes a sending module 302, configured to send a signal or information, for example, configured to send a PUSCH to the network device.

The apparatus 300 includes a processing module 303, configured to process the received signal or information, for example, configured to decode the signal or the information received by the receiving module 301. The processing module 303 may further generate a to-be-sent signal or information, for example, is configured to generate a signal or information to be sent by the sending module 302.

In this embodiment of this application, module division is an example, and is merely a logical function division. In actual implementation, another division manner may be used. For example, the receiving module 301 and the sending module 302 may alternatively be integrated into a transceiver module or a communications module. In addition, the functional modules in embodiments of this application may be integrated into one module, or each of the modules may exist alone physically, or two or more modules may be integrated into one module. The integrated module may be implemented in a form of hardware, or may be implemented in a form of a software functional module.

In a possible implementation, the apparatus 300 is configured to implement a function of the network device in the foregoing method. The apparatus may be a network device, or may be another apparatus that can implement a function of the network device. The another apparatus can be installed in the network device, or be matched with the network device for use.

The apparatus 300 includes a receiving module 301, configured to receive a signal or information, for example, configured to receive a PUSCH from a terminal device.

The apparatus 300 includes a sending module 302, configured to send a signal or information, for example, configured to send one or more of the following signals to the terminal device: first DCI, second DCI, and a PDSCH.

The apparatus 300 includes a processing module 303, configured to process the received signal or information, for example, configured to decode the signal or the information received by the receiving module 301. The processing module 303 may further generate a to-be-sent signal or information, for example, is configured to generate a signal or information to be sent by the sending module 302.

Figure 4:
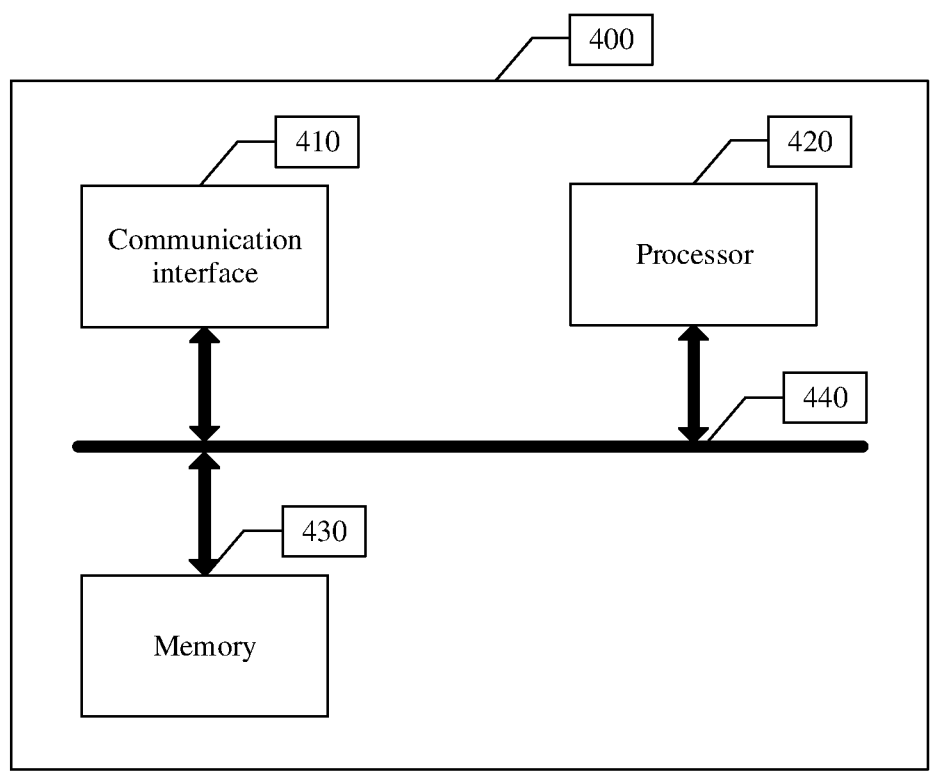

FIG. 4 shows an apparatus 400 according to an embodiment of this application.

In a possible implementation, the apparatus 400 is configured to implement a function of the terminal device in the foregoing method. The apparatus may be a terminal device, or may be another apparatus that can implement a function of the terminal device. The another apparatus can be installed in the terminal device, or be matched with the terminal device for use. For example, the apparatus 400 may be a chip system. In this embodiment of this application, the chip system may include a chip, or include the chip and another discrete device. The apparatus 400 includes at least one processor 420, configured to implement a function of the terminal device in the method provided in the embodiments of this application. For example, the processor 420 may generate and send a signal such as a PUSCH, and may be configured to receive and process one or more of the following signals: first DCI, second DCI, and a PDSCH. For details, refer to the detailed description in the method example.

The apparatus 400 may further include at least one memory 430, configured to store program instructions and/or data. The memory 430 is coupled to the processor 420. The coupling in this embodiment of this application is indirect coupling or a communication connection between apparatuses, units, or modules for information exchange between the apparatuses, the units, or the modules, and may be in electrical, mechanical, or other forms. The processor 420 may cooperate with the memory 430. The processor 420 may execute the program instructions stored in the memory 430. At least one of the at least one memory may be included in the processor 420.

The apparatus 400 may further include a communications interface 410, configured to communicate with another device by using a transmission medium, so that an apparatus in the apparatus 400 may communicate with the another device. For example, the another device may be a network device. The processor 420 sends and receives signals by using the communications interface 410, and is configured to implement a function of the terminal device described in the foregoing method embodiment.

In a possible implementation, the apparatus 400 is configured to implement a function of the network device in the foregoing method. The apparatus may be a network device, or may be another apparatus that can implement a function of the network device. The another apparatus can be installed in the network device, or be matched with the network device for use. For example, the apparatus 400 may be a chip system. The apparatus 400 includes at least one processor 420, configured to implement a function of the network device in the method provided in the embodiments of this application. For example, the processor 420 may receive and process a signal such as a PUSCH, and may be configured to generate and send one or more of the following signals: first DCI, second DCI, and a PDSCH. For details, refer to the detailed description in the method example.

The apparatus 400 may further include at least one memory 430, configured to store program instructions and/or data. The memory 430 is coupled to the processor 420. The processor 420 may cooperate with the memory 430. The processor 420 may execute the program instructions stored in the memory 430. At least one of the at least one memory may be included in the processor 420.

The apparatus 400 may further include a communications interface 410, configured to communicate with another device by using a transmission medium, so that an apparatus in the apparatus 400 may communicate with the another device. For example, the another device may be a terminal device. The processor 420 sends and receives signals by using the communications interface 410, and is configured to implement a function of the network device described in the foregoing method embodiment.

A specific connection medium between the communications interface 410, the processor 420, and the memory 430 is not limited in this embodiment of this application. In this embodiment of this application, the memory 430, the processor 420, and the communications interface 410 are connected by using a bus 440 in FIG. 4. The bus is indicated by using a bold line in FIG. 4. A manner of connecting other components is merely an example for description, and is not limited. The bus may be classified into an address bus, a data bus, a control bus, and the like. For ease of representation, only one bold line is used for representation in FIG. 4, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In the embodiments of this application, the memory may be a persistent storage/memory, for example, a hard disk drive (HDD) or a solid-state drive (SSD), or may be a non-persistent storage/memory, for example, a random-access memory (RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store program instructions and/or data.

The technical solutions provided in the embodiments of this application may be wholly or partially implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to the embodiments of the present application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In the embodiments of this application, on the premise that there is no logical contradiction, the embodiments may be mutually referenced. For example, methods and/or terms between the method embodiments may be mutually referenced. For example, functions and/or terms between the apparatus embodiments may be mutually referenced. For example, functions and/or terms between the apparatus embodiments and the method embodiments may be mutually referenced.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A control information transmission method, comprising:
    detecting first downlink control information (DCI), in a first specific search space, by a terminal device, wherein
    the first DCI indicates an active bandwidth part (BWP) of the terminal device,
    the active BWP is used by the terminal device and a network device to transmit a physical data channel,
    a size of the first DCI and a size of a second DCI are aligned,
    the second DCI can be transmitted in a first common search space,
    the second DCI is used to schedule a system message, a paging message, or a random access response (RAR),
    the first specific search space is included in a plurality of specific search spaces of the terminal device,
    one of the plurality of specific search spaces corresponds to N1 DCI formats, and the plurality of specific search spaces correspond to N2 DCI formats in total, and
    sizes of DCI in the N2 DCI formats are aligned in association with the DCI being transmitted in a corresponding specific search space, wherein N1 is an integer greater than or equal to 1, and N2 is an integer greater than or equal to N1.

2. The method according to claim 1, wherein the size of the first DCI and the size of the second DCI are aligned comprises:
    a quantity of bits of a bit stream of the first DCI is equal to a quantity of bits of a bit stream of the second DCI, wherein
    the bit stream of the first DCI is an information bit stream of the first DCI, or the bit stream of the first DCI is a bit stream obtained after the information bit stream of the first DCI is padded or truncated, and the bit stream of the second DCI is an information bit stream of the second DCI; or
    the bit stream of the first DCI is a bit stream obtained after a first operation is performed on the information bit stream of the first DCI, and the bit stream of the second DCI is a bit stream obtained after the first operation is performed on an information bit stream of the second DCI, wherein the first operation comprises one or more of: adding a cyclic redundancy check (CRC) bit, channel coding, and scrambling; or
    a quantity of modulation symbols corresponding to the first DCI is equal to a quantity of modulation symbols corresponding to the second DCI.

3. The method according to claim 1, wherein
    the first DCI comprises a frequency domain resource allocation field indicating a frequency domain resource allocated to the physical data channel in the active BWP, wherein
    a size of the frequency domain resource allocation field is determined based on bandwidth of an initial BWP, and the initial BWP is used by the terminal device to receive a synchronization signal block (SSB) from the network device; or
    the size of the frequency domain resource allocation field is determined based on bandwidth of a control resource set (CORESET) 0, and the CORESET 0 is used by the terminal device to receive, from the network device, DCI scrambled using a system information radio network temporary identifier (SI-RNTI).

4. The method according to claim 1, wherein the first DCI is further configured for transmission in a second common search space.

5. The method according to claim 1, wherein
    the physical data channel comprises a physical downlink shared channel (PDSCH) or a physical uplink shared channel (PUSCH), and
    the first DCI further indicates whether the first DCI is used to schedule the PDSCH or used to schedule the PUSCH.

6. The method according to claim 1, wherein the size of the first DCI transmitted in the first specific search space is the same as the size of the second DCI transmitted in the first common search space.

7. The method according to claim 1, wherein
    a first piece of the first DCI is used to schedule a physical downlink shared channel (PDSCH), and
    a second piece of the first DCI is used to scheduled a physical uplink shared channel (PUSCH).

8. An apparatus, comprising:
    one or more processors; and
    a non-transitory computer readable storage medium having computer-readable instructions stored therein that, when executed by the one or more processors, cause the apparatus to:
        detect first downlink control information (DCI) in a first specific search space, wherein
            the first DCI indicates an active bandwidth part (BWP) of a terminal device,
            the active BWP is used by the terminal device and a network device to transmit a physical data channel,
            a size of the first DCI and a size of a second DCI are aligned,
            the second DCI is DCI that can be transmitted in a first common search space,
            the second DCI is used to schedule a system message, a paging message, or a random access response (RAR),
            the first specific search space is included in a plurality of specific search spaces of the terminal device,
            one of the plurality of specific search spaces corresponds to N1 DCI formats, and the plurality of specific search spaces correspond to N2 DCI formats in total, and
            sizes of DCI in the N2 DCI formats are aligned in association with the DCI being transmitted in a corresponding specific search space, wherein N1 is an integer greater than or equal to 1, and N2 is an integer greater than or equal to N1.

9. The apparatus according to claim 8, wherein the size of the first DCI and the size of the second DCI are aligned comprises:
    a quantity of bits of a bit stream of the first DCI is equal to a quantity of bits of a bit stream of the second DCI, wherein the bit stream of the first DCI is an information bit stream of the first DCI, or the bit stream of the first DCI is a bit stream obtained after the information bit stream of the first DCI is padded or truncated, and the bit stream of the second DCI is an information bit stream of the second DCI; or the bit stream of the first DCI is a bit stream obtained after a first operation is performed on the information bit stream of the first DCI, and the bit stream of the second DCI is a bit stream obtained after the first operation is performed on an information bit stream of the second DCI, wherein the first operation comprises one or more of: adding a cyclic redundancy check (CRC) bit, channel coding, and scrambling; or a quantity of modulation symbols corresponding to the first DCI is equal to a quantity of modulation symbols corresponding to the second DCI.

10. The apparatus according to claim 8, wherein the first DCI comprises a frequency domain resource allocation field indicating a frequency domain resource allocated to the physical data channel in the active BWP, wherein a size of the frequency domain resource allocation field is determined based on bandwidth of an initial BWP, and the initial BWP is used by the terminal device to receive a synchronization signal block (SSB) from the network device; or the size of the frequency domain resource allocation field is determined based on bandwidth of a control resource set (CORESET) 0, and the CORESET 0 is used by the terminal device to receive, from the network device, DCI scrambled by using a system information radio network temporary identifier (SI-RNTI).

11. The apparatus according to claim 8, wherein the first DCI is further configured for transmission in a second common search space.

12. The apparatus according to claim 8, wherein the physical data channel comprises a physical downlink shared channel (PDSCH) or a physical uplink shared channel (PUSCH), and the first DCI further indicates whether the first DCI is used to schedule the PDSCH or used to schedule the PUSCH.

13. The apparatus according to claim 8, wherein a CRC bit of the first DCI is scrambled using a radio network temporary identifier (RNTI) specific to the terminal device.

14. The apparatus according to claim 8, wherein the size of the first DCI transmitted in the first specific search space is the same as the size of the second DCI transmitted in the first common search space.

15. The apparatus according to claim 8, wherein a first piece of the first DCI is used to schedule a physical downlink shared channel (PDSCH), and a second piece of the first DCI is used to scheduled a physical uplink shared channel (PUSCH).

16. A non-transitory computer readable storage medium having computer readable instructions stored therein that, when executed by a processor, cause the processor to provide execution comprising:

detecting first downlink control information (DCI), in a first specific search space, by a terminal device, wherein the first DCI indicates an active bandwidth part (BWP) of the terminal device, the active BWP is used by the terminal device and a network device to transmit a physical data channel, a size of the first DCI and a size of a second DCI are aligned, the second DCI is DCI that can be transmitted in a first common search space, the second DCI is used to schedule a system message, a paging message, or a random access response (RAR), the first specific search space is included in a plurality of specific search spaces of the terminal device, one of the plurality of specific search spaces corresponds to N1 DCI formats, and the plurality of specific search spaces correspond to N2 DCI formats in total, and sizes of DCI in the N2 DCI formats are aligned in association with the DCI being transmitted in a corresponding specific search space, wherein N1 is an integer greater than or equal to 1, and N2 is an integer greater than or equal to N1.

17. The non-transitory computer readable medium according to claim 16, wherein the size of the first DCI and the size of the second DCI are aligned comprises:

a quantity of bits of a bit stream of the first DCI is equal to a quantity of bits of a bit stream of the second DCI, wherein the bit stream of the first DCI is an information bit stream of the first DCI, or the bit stream of the first DCI is a bit stream obtained after the information bit stream of the first DCI is padded or truncated, and the bit stream of the second DCI is an information bit stream of the second DCI; or the bit stream of the first DCI is a bit stream obtained after a first operation is performed on the information bit stream of the first DCI, and the bit stream of the second DCI is a bit stream obtained after the first operation is performed on an information bit stream of the second DCI, wherein the first operation comprises one or more of: adding a cyclic redundancy check (CRC) bit, channel coding, and scrambling; or a quantity of modulation symbols corresponding to the first DCI is equal to a quantity of modulation symbols corresponding to the second DCI.

18. The non-transitory computer readable medium according to claim 16, wherein the first DCI comprises a frequency domain resource allocation field indicating a frequency domain resource allocated to the physical data channel in the active BWP, wherein a size of the frequency domain resource allocation field is determined based on bandwidth of an initial BWP, and the initial BWP is used by the terminal device to receive a synchronization signal block (SSB) from the network device; or the size of the frequency domain resource allocation field is determined based on bandwidth of a control resource set (CORESET) 0, and the CORESET 0 is used by the terminal device to receive, from the network device, DCI scrambled using a system information radio network temporary identifier (SI-RNTI).

19. The non-transitory computer readable medium according to claim 16, wherein the size of the first DCI transmitted in the first specific search space is the same as the size of the second DCI transmitted in the first common search space.

20. The non-transitory computer readable medium according to claim 16, wherein
- a first piece of the first DCI is used to schedule a physical downlink shared channel (PDSCH), and
- a second piece of the first DCI is used to scheduled a physical uplink shared channel (PUSCH).

* * * * *